United States Patent [19]
Ohyoshi et al.

[11] Patent Number: 6,118,759
[45] Date of Patent: Sep. 12, 2000

[54] NETWORK SYSTEM AND FRAME RELAY SWITCH

[75] Inventors: Akitsugu Ohyoshi; Junichi Katoh, both of Kanagawa, Japan

[73] Assignee: Fujitsu Limited, Kanagawa, Japan

[21] Appl. No.: 08/837,558

[22] Filed: Apr. 21, 1997

[30] Foreign Application Priority Data

Oct. 28, 1996 [JP] Japan .................................. 8-285668

[51] Int. Cl.<sup>7</sup> .................................................. G01R 31/08
[52] U.S. Cl. ........................ 370/229; 370/236; 370/225
[58] Field of Search ................................ 370/216, 227,
370/228, 229, 230, 231, 232, 235, 237,
241, 244, 242, 351, 389, 236, 225, 226

[56] References Cited

U.S. PATENT DOCUMENTS

| | | | |
|---|---|---|---|
| 5,189,662 | 2/1993 | Kleine Altekamp | 370/227 |
| 5,450,394 | 9/1995 | Gruber et al. | 370/253 |
| 5,490,140 | 2/1996 | Abensour et al. | 370/352 |
| 5,490,141 | 2/1996 | Lai et al. | 370/352 |
| 5,533,017 | 7/1996 | Thor | 370/419 |
| 5,848,058 | 12/1998 | Ooyoshi et al. | 370/244 |
| 5,867,677 | 2/1999 | Tsukamoto | 395/311 |
| 5,878,045 | 3/1999 | Timbs | 370/466 |
| 5,878,343 | 3/1999 | Robert et al. | 455/424 |

FOREIGN PATENT DOCUMENTS

| | | |
|---|---|---|
| 6-152635 | 5/1994 | Japan . |
| 06276215A | 9/1994 | Japan . |

*Primary Examiner*—Ajit Patel
*Assistant Examiner*—Brian Nguyen
*Attorney, Agent, or Firm*—Helfgott & Karas, P C.

[57] ABSTRACT

A network system in which administrators of frame relay networks can recognize the quality of the ATM network suitably and manage the frame relay networks in accordance with the quality condition of the ATM network. When a frame F is transmitted from a frame relay network FR1 at a transmitting side to an IWF, a frame header in which a transmission number is stored is added to the frame F. Then, the frame F is received by a frame relay network FR2 at a transmitted side through the IWF and the ATM network. In the frame relay network FR2, a difference between the transmission number stored in the frame header of the frame F and a reception condition variable kept in the frame relay network FR2 is calculated, and the difference is stored in a quality information collection table as a number of discarded frames in the ATM network.

22 Claims, 22 Drawing Sheets

NETWORK SYSTEM AND FRAME RELAY SWITCH

BACKGROUND OF THE INVENTION

1. Field of the Invention

The present invention relates to a network system which an ATM (Asynchronous Transfer Mode) network is used as a relay for plural frame relay networks and to a frame relay switch comprised in those frame relay networks.

2. Description of the Related Art

Recently, the B-ISDN (Broadband Integrated Service Digital Network) is rapidly introduced as the LAN (Local Area Network) is made a high speed and a multimedia. Under this condition, in a data communication network, there are many cases that an ATM network is used as a network relaying plural frame relay networks. FIG. 23 is a schematic diagram illustrating a network which an ATM switch is used as a relay for plural frame relay networks. The network system is structured based on the ITU-T (International Telecommunication Union-Telecommunication Standardization Sector) recommendation Q. 922. Respective frame relay networks 1, 2 are connected with an ATM network 3 through IWFs (InterWork Function) 4. The frame relay networks 1, 2 are also connected with terminals 5, 6, respectively.

The IWF 4 is a converter converting a frame used for transmitting/receiving data in the frame relay networks 1, 2 to ATM cells used for transmitting/receiving data in the ATM network 3. When the IWF 4 receives a frame from the frame relay network 1 or the frame relay network 2, the IWF 4 divides (disassembles) the frame into plural cell data and adds cell headers thereto, respectively, so as to transmit to the ATM network 3. Moreover, when the IWF 4 receives plural ATM cells enough to disassemble one frame from the ATM network 3, the IWF 4 removes the cell headers from the plural ATM cells and assembles the respective cell data so as to assemble the frame, and then transmits the frame to the frame relay network 1 or the relay network 2 connected with the IWF 4.

In a network like this, when a congestion occurs in the frame relay networks 1, 2, the FECN (Forward Explicit Congestion Notification-bit) and the BECN (Backward Explicit Congestion Notification-bit) stored in a core header of the frame are set to "1", whereby it is recognized that the congestion occurs in the frame relay networks 1, 2. Moreover, when a congestion occurs in the ATM network 4, the congestion notification (PT: Payload Type (EFCI)) stored in a cell header of the ATM cell is set to "1".

However, the above-described conventional network system has the following problems. For instance, as shown in FIG. 24, when the terminal 5 transmits plural frames a–d to the terminal 6 as a transmitted side, a congestion occurs in the ATM network 3, and then the frames b, c are discarded in the ATM network 3, and the frames a, d are transmitted to the terminal 6. In this case, the frame relay network 2 can not recognize that the frames b, c are discarded in the ATM network 3 based on the procedure specified in the Q. 922 ANNEXA of the ITU-T recommendation.

Further, as shown in FIG. 25, in a case that the terminal 5 transmits plural frames a–d to the terminal 6 as a transmitted side, when a congestion occurs in the frame relay networks 1 or the ATM network 3, the FECN in the core header of the frame or the EFCI in the cell header is set to "1" and the congestion is informed to the frame relay network 2. Then, the IWF 4 at the side of the frame relay network 2 removes the cell header when the frame is assembled from the plural ATM cells. Thus, the content of the EFCI in the cell header or that of the FECN in the core header of the frame is set in a core header of a frame which is transmitted to the frame relay network 2. As the result, the frame relay network 2 can recognize that the congestion occurs in the frame relay network 1 or the ATM network 3 based on that the FECN is "1", but can not recognize in which of the frame relay network 1 or the ATM network 3.

As above described, there is a problem that the conventional network system can not recognize the quality of the ATM network suitably, therefore, when users of the terminals 5, 6 make complaints such as frames are often discarded or the throughput can not be raised caused by congestion notification frequent occurrence, administrators for the frame relay networks 1, 2 can not deal with these complaints suitably.

SUMMARY OF THE INVENTION

Accordingly, it is an object of the present invention to solve the above described problems, and to provides a network system and a frame relay switch, wherein administrators for frame relay networks can recognize the quality of the ATM network properly and can manage the frame relay networks in accordance with the ATM network quality condition.

The present invention introduces the following structure to solve the above described problems.

In the first aspect of the present invention, a network system comprising an ATM (Asynchronous Transfer Mode) network, plural IWFs (InterWork Function) respectively connected to the ATM network, plural frame relay networks respectively connected to the plural IWFs, and plural terminals respectively connected to the plural frame relay networks. Then, each of said plural frame relay networks including addition unit, when a frame is transmitted to one of the plural IWFs, for adding a quality information header in which quality information of the ATM network is stored to the frame; reading unit, when a frame is received from one of the plural IWFs, for reading the quality information from the quality information header of the frame; and, memory unit for memorizing the quality information read by the reading unit.

According to the network system of the present invention, one frame relay network at the frame transmitting side adds the quality information header in which the ATM network quality information is stored to a frame transmitted from the terminal. Then, the frame is received in another frame relay network at the frame transmitted side through a transmitting side IWF, the ATM network and a transmitted side IWF. At that time, the ATM network quality information is stored in the quality information header of the header. When the another frame relay network at the transmitted side receives a frame, it reads and stores the ATM network quality information stored in the quality information header and stores. Therefore, it becomes possible for an administrator for the frame relay network at the transmitted side to recognize the quality of the ATM network properly.

In the second aspect of the present invention, the network system in the first aspect further comprises a backup circuit connected to each of the plural frame relay networks; wherein each of said plural frame relay networks further comprises backup unit for connecting one of the plural frame relay networks and the backup circuit based on the quality information memorized in said memory unit. According to the second aspect, the backup circuit is connected to the ATM network based on the ATM quality information in a case such that a congestion occurs, whereby a band for frame relay communication can be kept.

In the third aspect of the present invention, each of said backup unit disconnects one of the plural frame relay networks and the backup circuit based on the quality information memorized in said memory unit. For instance, the quality information memorized in said memory unit may be a number of discarded frames in the ATM network for a predetermined period, and said backup unit, when the number memorized in said memory unit of the discarded frames becomes not less than a predetermined threshold, may connect one of the plural frame relay networks and said backup circuit (ninth aspect). The quality information memorized in said memory unit may also be a number of congestion notifications in the ATM network for a predetermined period, and said backup unit, when the number memorized in said memory unit of the congestion notifications becomes not less than a predetermined threshold, may connect one of the plural frame relay networks and said backup circuit (tenth aspect). Further, the quality information memorized in said memory unit may be a number of discarded frames in the ATM network for a predetermined period, and said backup unit, when the number memorized in said memory unit of the discarded frames becomes less than a predetermined threshold, may disconnect one of the plural frame relay networks and said backup circuit (eleventh aspect). The quality information memorized in said memory unit may also be a number of congestion notifications in the ATM network for a predetermined period, and said backup unit, when the number memorized in said memory unit of the congestion notifications becomes less than a predetermined threshold, may disconnect one of the plural frame relay networks and said backup circuit (twelfth aspect).

In the fourth embodiment of the present invention, each of the plural frame relay networks further includes caution unit for outputting a caution message outward based on the quality information memorized in said memory unit. According to the fourth aspect, it becomes possible for administrators of the frame relay networks to manage the frame relay networks properly. For instance, the quality information memorized in said memory unit may be a number of discarded frames in the ATM network for a predetermined period, and said caution unit may start when the number memorized in said memory unit of the discarded frames becomes not less than a predetermined threshold (seventh aspect). The quality information memorized in said memory unit may be a number of congestion notifications from the ATM network for a predetermined period, and said caution unit starts when the number memorized in said memory unit of the congestion notifications becomes not less than a predetermined threshold (eighth aspect).

In the fifth aspect of the present invention, each of the plural frame relay networks further including: reception frequency storage unit for memorizing a reception frequency of frames received from one of the plural IWFs; transmission number storage unit, when the frame is transmitted to one of the plural IWFs, for storing a transmission number in the quality information header of the frame; and, obtainment unit, when the frame is received from one of the plural IWFs, for reading the transmission number from the quality information header and reading the reception frequency of the frame from the reception frequency storage unit, and for obtaining a difference between the transmission number and the reception frequency of the frame as a number of discarded frames in the ATM network. According to the fifth aspect, it becomes possible for the administrator of the frame relay network at the frame transmitted frame network to obtain a number of discarded frames in the ATM network.

In the sixth aspect of the present invention, each of the plural IWFs further including; restoration unit for restoring plural cells received from the ATM network to one frame; and, edition unit, when a congestion notification is stored in a cell header of one of the plural cells, for storing the congestion notification in the quality information header. According to the sixth aspect, it becomes possible for the administrator of the frame relay network at the frame transmitted frame network to recognize the congestion notification from the frame relay network at the transmitted side and that from the ATM network separately.

In the thirteenth aspect of the present invention, each of the plural frame relay networks further includes change unit for changing the predetermined threshold for a new threshold which is inputted.

In the fourteenth aspect of the present invention, each of the plural frame relay networks is connected to one of the plural IWFs through a channel which plural data links are set, and the quality information of the ATM network is memorized correspondingly to the plural data links. According to the fourteenth aspect, it becomes possible for the administrator of the frame relay network to obtain more detailed ATM network quality information, whereby the administrator can deal with the ATM network more suitably.

In the fifteenth aspect, each of the plural frame networks, when the each of the plural frame networks and the backup circuit are connected, transmits the frame to the backup circuit and an IWF connected to the each of the plural frame networks.

In the sixteenth aspect, each of the plural frame networks, when the each of the plural frame networks and the backup circuit are connected, stores a discard eligibility indicator indicating that the frame is enable to be discarded in taking priority in the quality information header. According to the sixteenth aspect, the frame which the discard possibility display is stored is discarded in taking priority, therefore, for example, when the frame is discarded in the frame relay network to which the frame is transmitted, it can be avoided that frames are redundantly transmitted via both of the ATM network and the backup circuit to the transmitted terminal, and it can be prevented to decrease a band in the transmitted frame relay network.

Moreover, according to the present invention, a frame relay switch connected with an ATM (Asynchronous Transfer Mode) network through an IWF (InterWork Function) and comprised in a frame relay network connected with plural terminals. The frame relay network comprises: addition unit, when a frame is transmitted to the IWF, for adding a quality information header in which a quality information of the ATM network to the frame; reading unit, when a frame is received from the IWF, for reading the quality information from the quality information header; and, memory unit for memorizing the quality information read by the reading unit.

BRIEF DESCRIPTION OF THE DRAWINGS

Other objects and advantages of the present invention will become apparent during the following discussion conjunction with the accompanying drawings, in which.

DETAILED DESCRIPTION OF THE PREFERRED EMBODIMENTS

Detailed explanations will be given of a network system and a frame relay switch according to the present invention based on a preferred embodiment shown in drawings.

Figure 1:
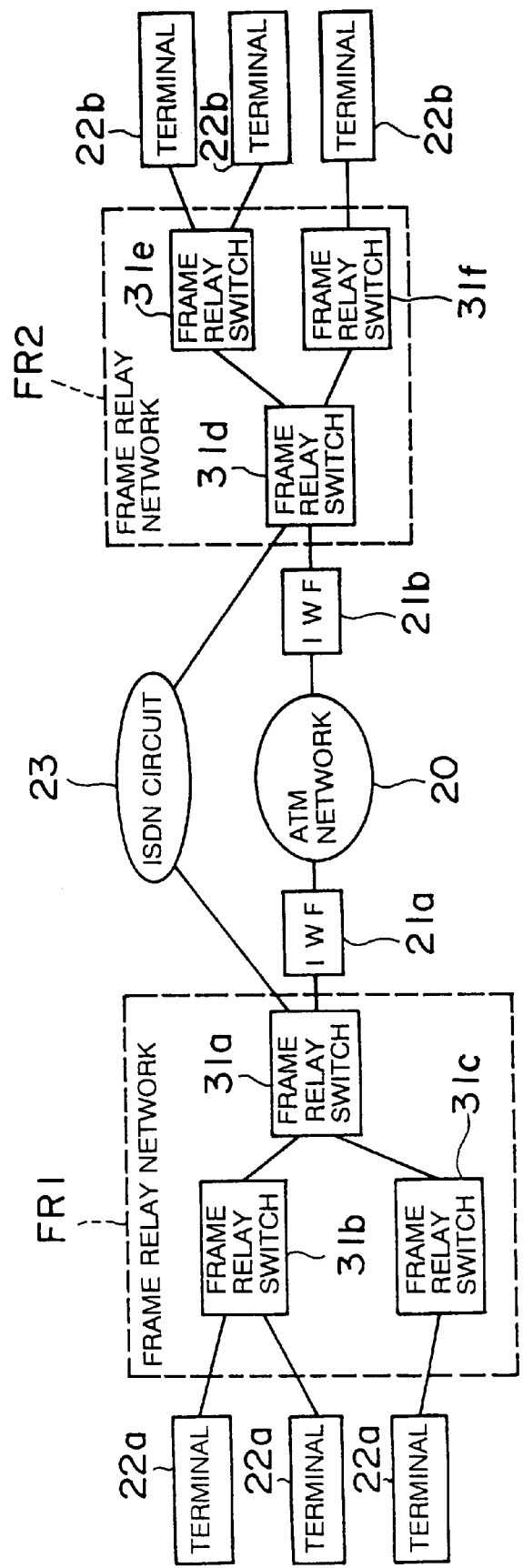
FIG. 1 is a whole structural view of a network system according to this embodiment.
Figure 13:
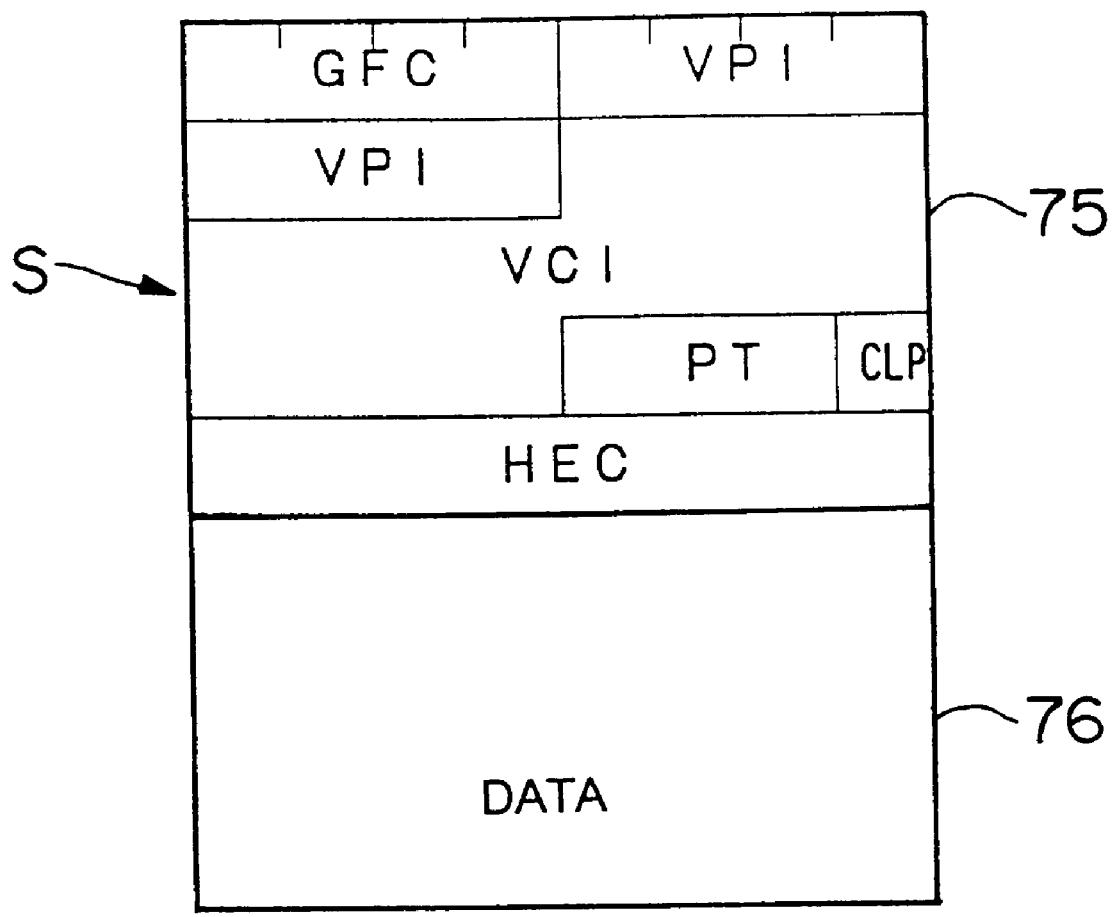
FIG. 13 is a structural view of an ATM cell.

First, an explanation will be given of an outline of the network system according to this embodiment. FIG. 1 is a whole structural view of the network system according to this embodiment. In the network system shown in FIG. 1, an ATM network 20 is connected with two frame relay networks FR1, FR2 through IWFs (InterWork Function) 21 (21a, 21b), respectively. The frame relay networks FRI, FR2 are respectively connected with plural frame relay terminals (hereinafter, simply called "terminal") 22a, 22b. Further, the frame relay network FR1 and the frame relay network FR2 are connected via an ISDN circuit 34 for backing up the ATM network 20. The ATM network 20 includes plural ATM switches not shown and relays a frame F (see FIG. 2) between the frame relay network FR1 and the frame relay network FR2. The IWF 21 is a converter for converting the frame F transmitted in the frame relay networks FR1, FR2 to cells S (see FIG. 13) transmitted in the ATM network 20. The respective frame relay networks FR1, FR2 include plural frame relay switches 31 connected through frame relay circuits. The respective terminals 22a, 22b are substantially connected with the frame relay switches 31 via the frame relay circuits included in the respective frame relay networks FR1, FR2. Moreover, the terminal 22a, 22b, when data is transmitted to another terminal, generates a frame F and transmits it to the frame relay networks FR1, FR2.

Figure 2:
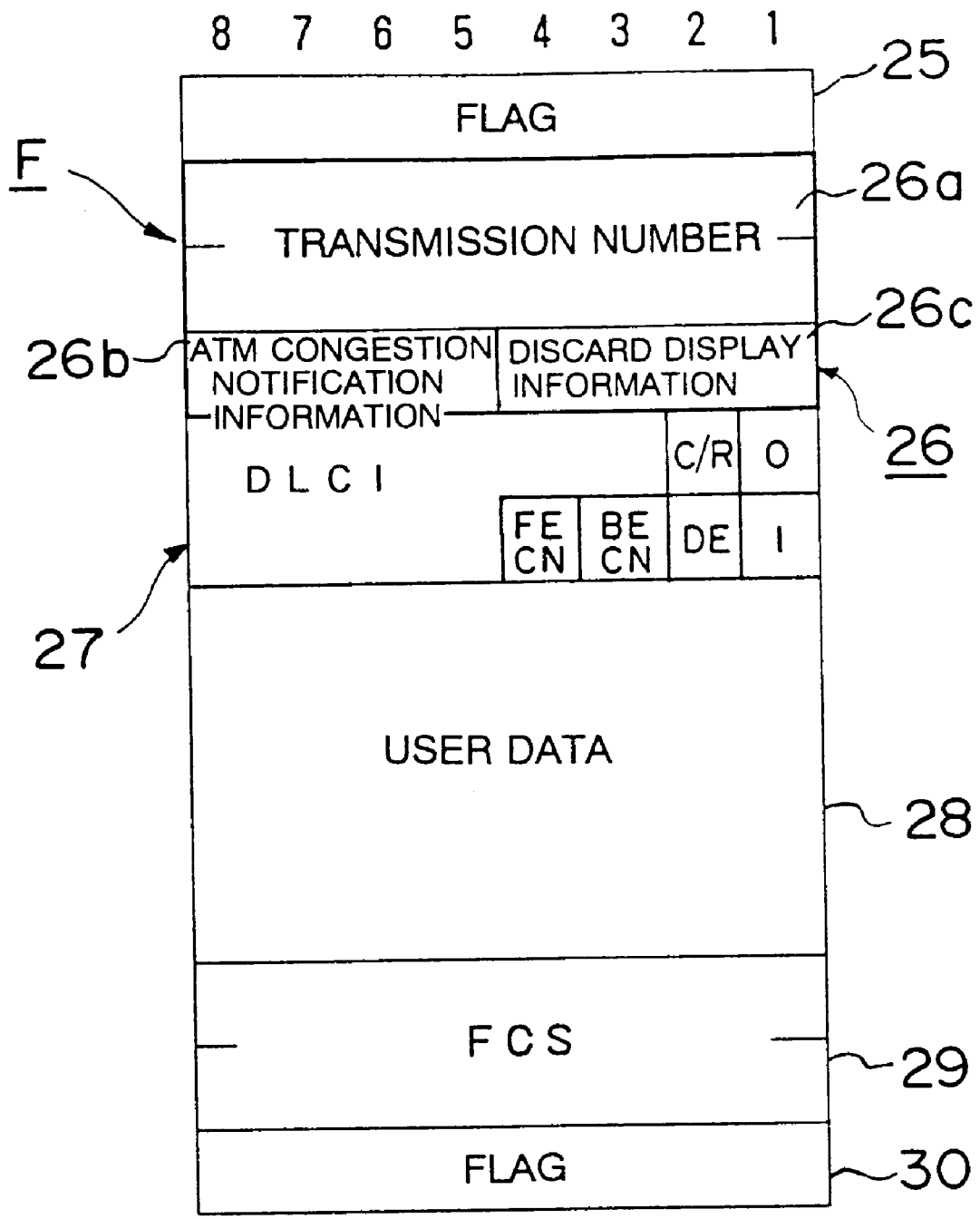
FIG. 2 is a structural view of a frame.

FIG. 2 is an explanatory view of a format of the frame F generated in the frame relay networks FR1, FR2. In FIG. 2, the frame F is structured based on the ITU-T (International Telecommunication Union-Telecommunication Standardization Sector) recommendation Q. 922. The frame F includes, in order from the head, a frame header between frame relay networks (hereinafter called "frame header", and corresponding to a quality information header) storage area 26, a core header storage area 27, a data storage area 28, and a FCS (Frame Check Sequence) storage area 29. Further, a head flag 25 and tail flag 26 are added to the head and the tail of the frame F, respectively.

The frame header storage area 26 includes a transmission number storage area 26a, a congestion information storage area 26b and an discard information storage area 26c. In the transmission number storage area 26a, the transmission number of the frame F is stored. In the congestion information storage area 26b, information whether there is a congestion notification from the ATM network 20 or not is stored. That is, in the congestion information storage area 26b, "0" is stored when there is no congestion notification from the ATM network 20 and "1" is stored when there is a congestion notification from the ATM network 20. In the discard information storage area 26c, information whether the frame F is required to be discarded or not is stored. That is, in the discard information storage area 26c, "0" is stored when the discard of the frame F is required and "1" is stored when the discard of the frame F is not required.

Further, the core header 27 is area for storing the Q. 922DL, namely, a DLCI (Data Link Connection Identifier) number, a FECN (Forward Explicit Notification-bit), a BECN (Backward Explicit Notification-bit), a DE (Discard Eligibility indicator) and so on are stored. The DLCI number is information to transmit the frame F to a predetermined terminal (transmitted terminal) by identifying plural data links (logical channels) set on the frame relay circuit (physical channel) in this network. That is, peculiar numbers (DLCI numbers) are given to the plural data links, respectively, and the frame F is transmitted through the data link with the DLCI number corresponding to the DLCI number stored in itself (the frame F). The FECN is information (bit) for informing that a congestion avoidance procedure is necessary for a transmitted terminal of the frame F. The BECN is information (bit) for informing that a congestion avoidance procedure is necessary for a transmitting terminal of the frame F. The FECN and the BECN are usually set to "0", and, when a congestion occurs, are changed to "1" in the frame relay network (frame relay switch) which the congestion occurs. The DE is information whether the frame F must be discarded in taking priority over another frame or not, and when the DE is "1", the frame is discarded in taking priority.

In the data storage area 28, user data of the terminals 22a, 22b or the like are stored. In the FCS storage area 29, information for detecting an error of the frame F is stored.

Further, the head and tail of the frame F can be recognized by the head flag 25 and the tail flag 30.

Each frame relay network FR1, FR2 includes plural frame relay switches 31. Namely, the frame relay network FR1 includes frame relay switches 31a–31c. The frame relay network FR2 includes frame relay switches 31d–31f.

Figure 3:
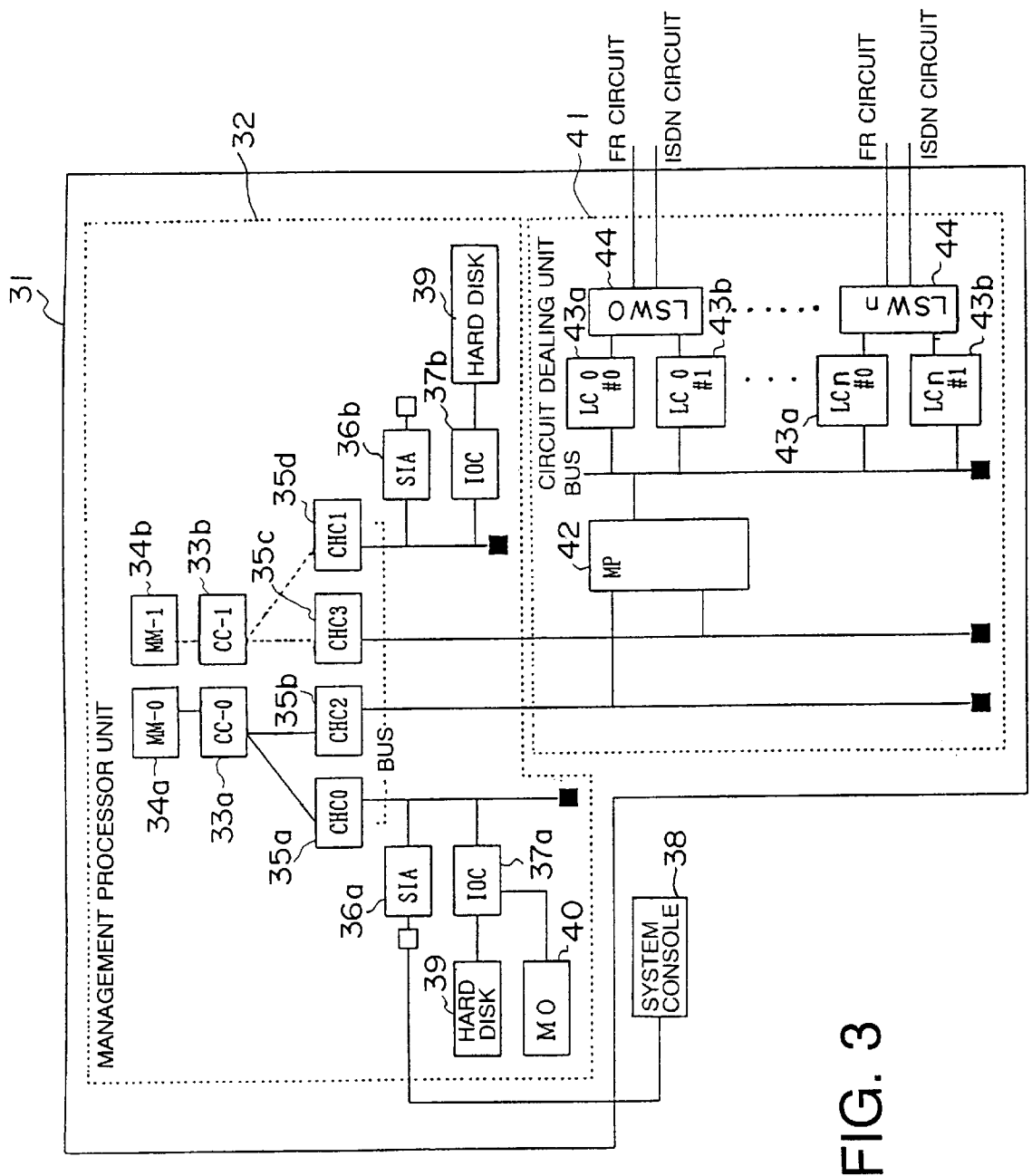
FIG. 3 is a circuit structural view of the frame relay switch shown in FIG. 1.

FIG. 3 is a sample of a block diagram illustrating a circuit structure of one of plural frame relay switch 31 included in the respective frame relay networks FR1, FR2. Each frame relay switch 31 is provided with a management processor unit 32 and a circuit dealing unit 41.

The management processor unit 32 performs the control and the monitor all over the frame relay switch 31, the maintenance and management for various data, the input/output control for commands and messages, the making and the keeping of connection records and the like. The management processor unit 32 is provided with an active CC (Central Controller) 33a, a spare CC 33b, an active MM (Main Memory) 34a connected with the CC 33a via a bus, a spare MM 34b connected with the CC 33b via a bus, an active CHCs (Channel Controller) 35a, 35b connected with the CC 33a via buses, a spare CHCs 35c, 35d connected with the CC 33b via buses, SIAs (Serial Interface Adapter) 36a, 36b and IOC (disk Input Output Controller) 37a, 37b connected with the CHCs 35a, 35d via buses, respectively, a system console 38 connected with the SIA 36a, hard disks 39 connected with the IOCs 37a, 37b, respectively, and a MO (Magnetic Optical disk) 40 connected with the IOC 37a.

The hard disk 39 is a medium storing a control program (computer program) for the frame relay switch 31 and data to perform the control program. The respective MMs 34a, 34b are operating areas for the CCs 33a, 33b, and when the CCs 33a, 33b perform the control program stored in the hard disk 39, the control program is loaded to the MMs 34a, 34b. The CCs 33a, 33b perform the control programs loaded to the MMs 34a, 34b, respectively, and send commands to the respective parts in the frame relay switch 31 to perform the operational control for the respective parts.

The respective CHCs 35a–35d perform the control of the input output channel (physical channel, logical channel) and the data transfer control with the MMs 34a, 34b in accordance with the commands from the respective CCs 33a, 33b. The IOCs 37a, 37b controls the operations of the hard disks 39 and the MO 40 in accordance with the commands from the respective CCs 33a, 33b. The MO 40 functions as an external unit of the frame relay switch 31 and performs the loading of the initial program, the storing of data stored in the hard disk 39.

The system console 38 is an interface for outputting data and the like stored in the hard disks 39 and the MO 40 to the outside and for inputting data, commands and so on from the outside.

The circuit dealing unit 41 is a CMU (Communication Multiplexer Unit) accepting plural frame relay circuits and the plural ISDN circuits 23. The circuit dealing unit 41 is provided with MPs (line Management Processor) 42 connected with the CHCs 35b, 35c via buses, respectively, plural pairs of LCs (Line Controller) 43a (active), 43b (spare) connected with the MP 42 via a bus, respectively, and plural LSW (Line Switch) 44 connected with the respective pairs of the LCs 43a, 43b.

Each LSW 44 accepts plural frame relay circuits and the ISDN circuits 23 and receives the frame F transmitted from the outside. Each LSW 44 also transmits the frame F to the frame relay circuit and/or ISDN circuit 23 corresponding to commands from the MP 42. Moreover, the LSW 44 controls logical, electrical and physical interfaces in accordance with commands from the MP 42 through the LCs 43a, 43b.

The LCs 43a, 43b perform a frame relay protocol process. The LCs 43a, 43b, when receive a frame F from one of LSWs 44, send to the MP 42. The LCs 43a, 43b also send the frame F received from the MP 42 to one of the LSWs 44. Further, the LCs 43a, 43b is provided with circuit end function for making the plural frame relay circuits and the ISDN circuits 23 end.

The MP 42 manages the line setting in the line dealing unit 41. That is, the MP 42 controls the communication between the CHCs 35b, 35c and the LCs 43a, 43b, respectively. Concretely, one of each pair of the LCs 43a, 43b is made in an operating state (active) and the other is made in a stopping state (spare). The MP 42, when receives a frame F from the active LC 43a, sends the received frame F to the active CHC 35b. In this way, the frame F is stored in the active MM 34a, and then predetermined processes are performed for the frame F. On the contrary, the MP 42, when receives a frame F from the CHC 35b, sends the frame F to the active LC 43a. Moreover, the MP 42 sends a transmitting command that a frame F is transmitted from which of the frame relay circuit and/or the ISDN circuits accepted in each LSW 44. The transmitting command is sent to the respective LSWs 44 through the LC 43a, 43b.

Each frame relay switch 31 structured like this performs the transmitting/receiving process of the frame F in accordance with the ITU-T recommendation Q. 922 and the ITU-T recommendation Q. 933. Concretely, each frame relay switch 31 performs the transmitting/receiving process of the frame F between the terminals 22a connected with the frame relay network FR1 or between the terminals 22b connected with the frame relay network FR2. Each frame relay switch 31 also performs the transmitting/receiving process of the frame F from the IWF 21a or the IWF 21b to a predetermined terminal 21 or terminal 22b. Further, the frame relay switch 31 performs the transmitting/receiving process of the frame F when the frame F is transmitted/received between the frame relay switch 31 in the frame relay network FR1 and the frame relay switch 31 in the frame relay network FR2 through the ISDN circuit 23.

Figure 4:
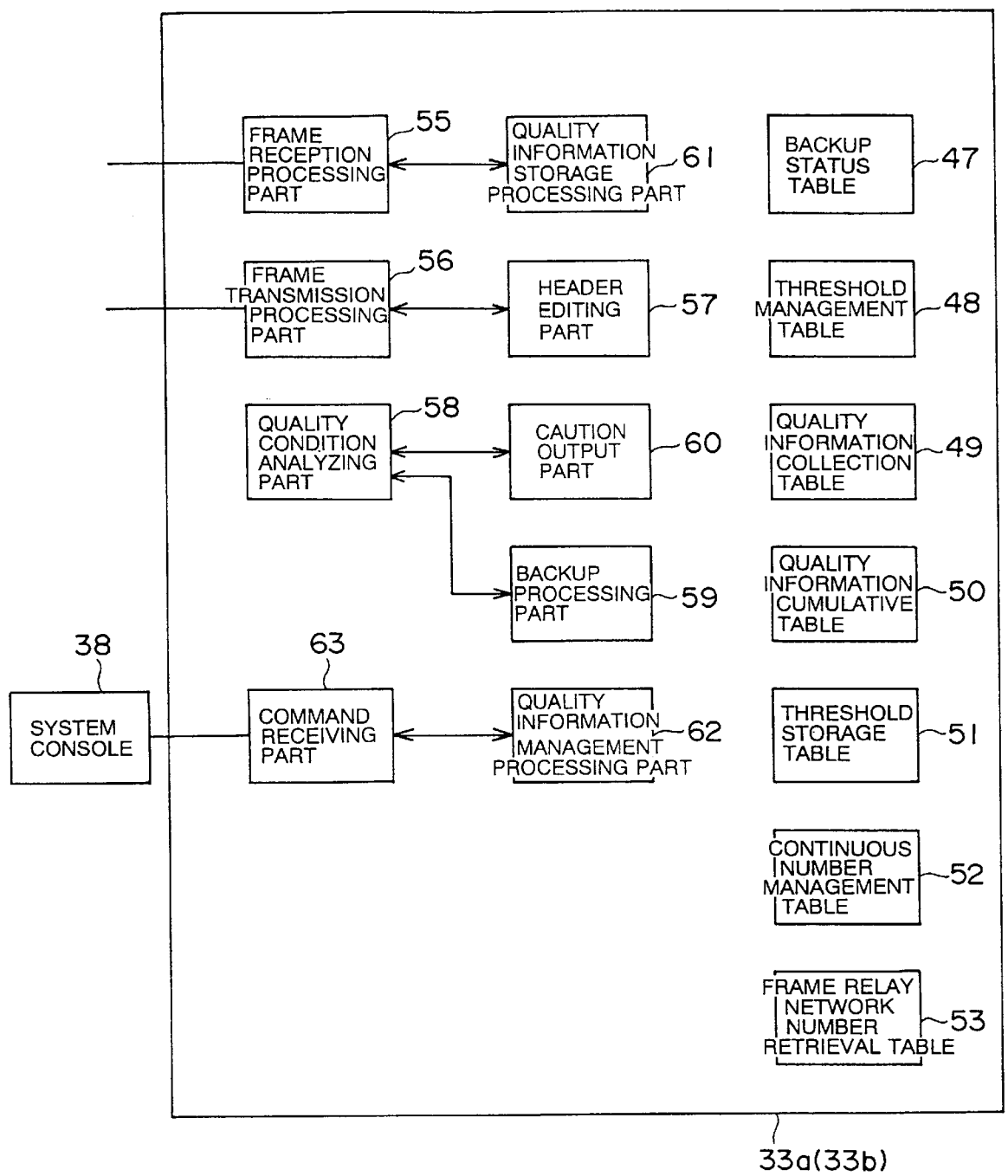
FIG. 4 is a block diagram illustrating functions operated by performing a control program in the frame relay switch shown in FIG. 3.

FIG. 4 is a block diagram illustrating a function that the control program stored in the hard disk 39 in the frame relay switch 31 is loaded to the MM 34a or the MM 34b and runs in the CC 33a or the CC 33b (through the MM 34a or the MM 34b). Concretely, as shown in FIG. 4, the control program runs in the CC 33a or the CC 33b, whereby a backup state management table 47, a threshold management table 48, a quality information collection table 49, a quality information cumulative table 50, a threshold storage table 51, a continuous number management table 52 and a frame relay network number retrieval table 53 are generated.

Further, the control program runs in the CC 33a or the CC 33b, whereby a frame reception processing part 55, a frame transmission processing part 56, a header editing part 57, a quality condition analyzing part 58, a backup processing part 59, a caution output part 60, a quality information storage processing potion 61, a quality information management processing potion 62, and a command receiving part 63 are implemented.

Figure 5:
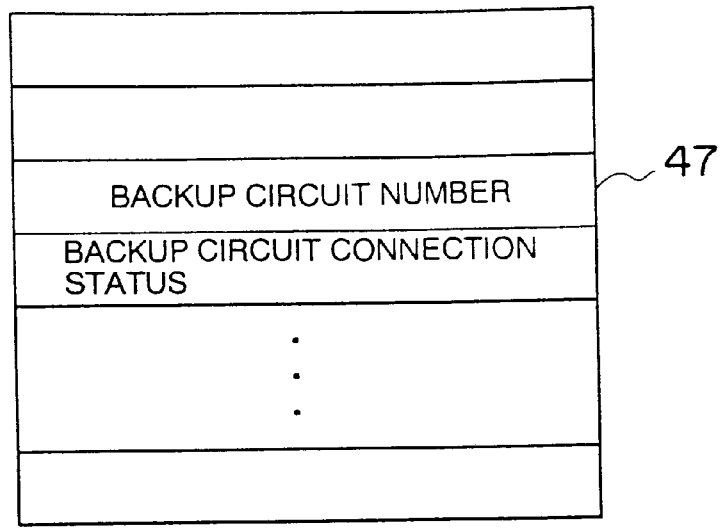
FIG. 5 is a structural view of the backup state management table shown in FIG. 4.

FIG. 5 is a structural view of the backup state management table 47. In FIG. 5, plural pairs of a backup circuit number and a backup circuit connection state are stored in the backup state management table 47. The backup circuit number is the number of the ISDN circuit 23 (see FIG. 1) which is a backup circuit. The backup circuit connection state is information whether the connection between the ISDN circuit 23 which the backup circuit number is given and the frame relay networks FR1, FR2 is completed or not, and "1" is stored when the connection is completed and "0" is stored except that the connection is completed. Further, each backup circuit number is stored in relation to a transmitted frame relay network number (peculiar number set for each frame relay network FR1, FR2 and frame relay network number connected with the transmitted terminal frame F), whereby the backup state management table 47 is retrieved by using the frame relay network number as a retrieval key.

Figure 6:
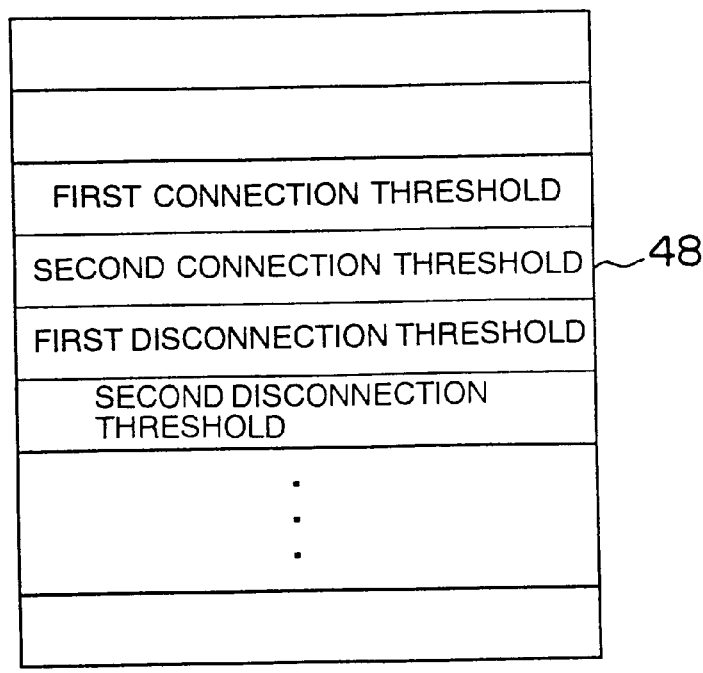
FIG. 6 is a structural view of the threshold management table shown in FIG. 4.

FIG. 6 is a structural view of the threshold management table 48. In FIG. 6, plural groups of a first connection threshold, a second connection threshold, a first disconnection threshold and a second disconnection threshold are stored in the threshold management table 48. The first and second connection thresholds are thresholds to be triggers for connecting the frame relay networks FR1, FR2 with the ISDN circuit 23 (see FIG. 1). In this network system, when the number of discarded frames F in the ATM network 20 exceeds the first connection threshold for a predetermined period, the frame relay networks FR1, FR2 and the ISDN circuit 23 are connected. Otherwise, when the number of congestion notifications received from the ATM network 20 exceeds the second connection threshold for a predetermined period, the frame relay networks FR1, FR2 and the ISDN circuit 23 are connected. Further, the first and second disconnection thresholds are thresholds to be triggers for disconnecting the frame relay networks FR1, FR2 and the ISDN circuit 23. In this network system, when the number of discarded frames F in the ATM network 20 becomes lower than the first disconnection threshold for a predetermined period and the congestion notifications received from the ATM network 20 becomes lower than the second disconnection threshold for a predetermined period, the frame relay networks FR1, FR2 and the ISDN circuit 23 are disconnected. Each group stored in the threshold management table 48 is stored in relation with the transmitted frame relay network number, and is retrieved by using the frame relay network number as a retrieval key.

Figure 7:
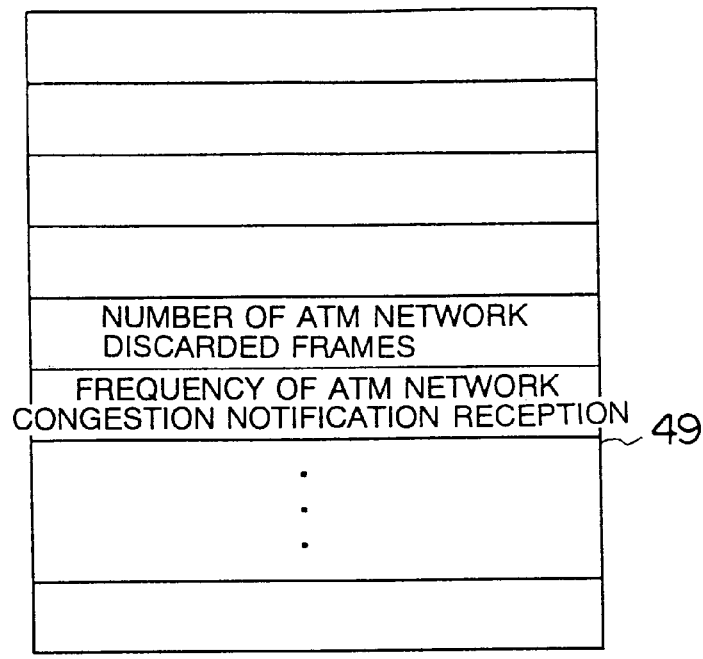
FIG. 7 is a structural view of the quality information collection table shown in FIG. 4.

FIG. 7 is a structural view of the quality information collection table 49. In FIG. 7, plural pairs of a number of ATM network discarded frames and a frequency of ATM network congestion notification reception are stored in the quality information collection table 49. The a number of ATM network discarded frames is a number of frames F discarded in the ATM network 20 for a predetermined period. The frequency of ATM network congestion notification reception is a number of frames F which congestions are informed from the ATM network 20 for a predetermined period. Each pair stored in the quality information collection table 49 is stored in relation with the transmitted frame relay network number and the DLCI number, and is retrieved by using the frame relay network number and the DLCI number as retrieval keys.

Figure 8:
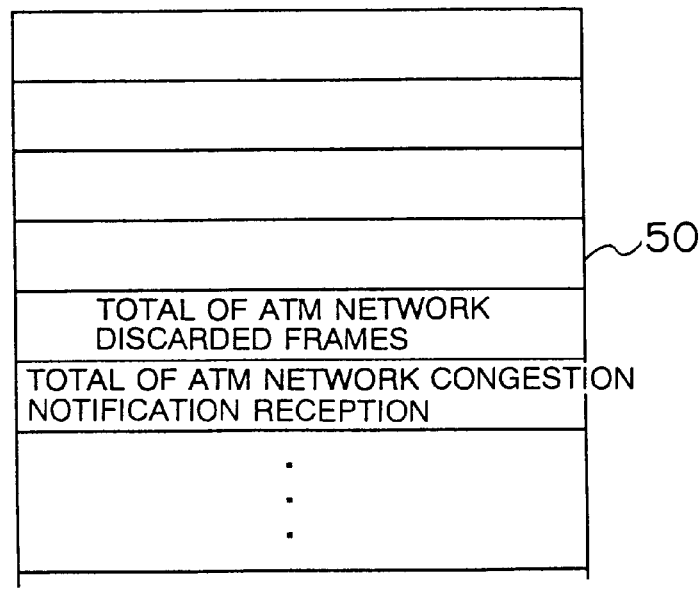
FIG. 8 is a structural view of the quality information cumulative table shown in FIG. 4.

FIG. 8 is a structural view of the quality information cumulative table 50. In FIG. 8, plural pairs of a total of ATM network discarded frames and a total of ATM network congestion notification reception frequency are stored in the quality information collection table 49. The a total of ATM network discarded frames is a total of frames F discarded in the ATM network 20. The total of ATM network congestion notification reception frequency is a total of frames F which congestions are informed from the ATM network 20. Each pair stored in the quality information cumulative table 50 is stored in relation with the transmitted frame relay network number and the DLCI number, and is retrieved by using the frame relay network number and the DLCI number as retrieval keys.

Figure 9:
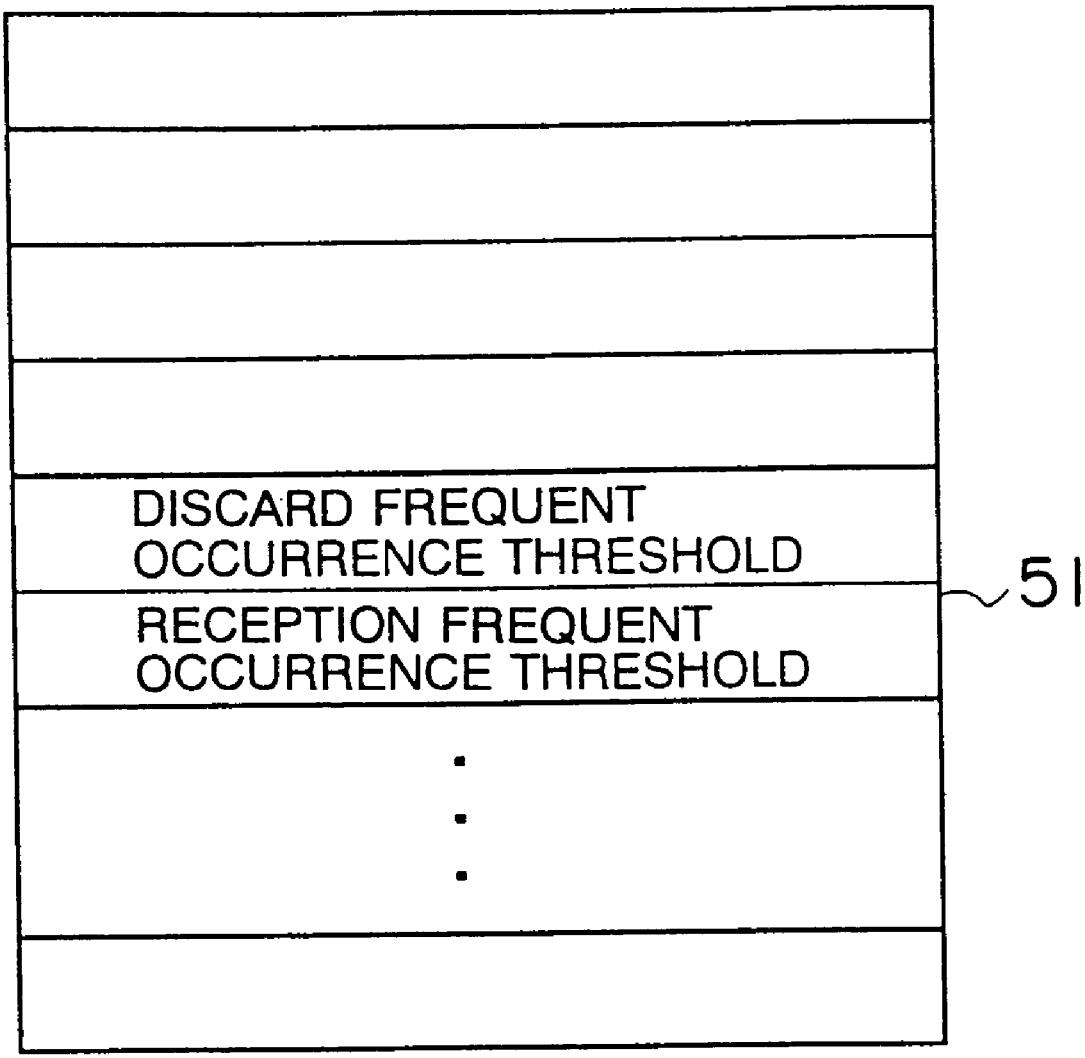
FIG. 9 is a structural view of the threshold storage table shown in FIG. 4.

FIG. 9 is a structural view of the threshold storage table 51. In FIG. 9, plural pairs of a discard frequent occurrence threshold and a reception frequent occurrence threshold are stored in the threshold storage table 51. The discard frequent occurrence threshold is a threshold which it is regarded that discard processes of frames F occur frequently in the ATM network 20 for a predetermined period. In this network system, when a number of discarded frames F in the ATM network 20 for the predetermined period exceeds the discard frequent occurrence threshold, the caution output part 60 (see FIG. 4) starts to output a caution message. The receiving frequent occurrence threshold is a threshold which it is regarded that frames F, which congestions are informed from the ATM network 20, occur frequently for a predetermined period. In this network system, when a number of frames F, which congestions are informed from the ATM network 20 to the frame relay switch 31 for the predetermined period, exceeds the receiving frequent occurrence threshold, the caution output part 60 outputs a caution message. Each pair stored in the threshold storage table 51 is stored in relation with the transmitted frame relay network number and the DLCI number, and is retrieved by using the frame relay network number and the DLCI number as retrieval keys.

Figure 10:
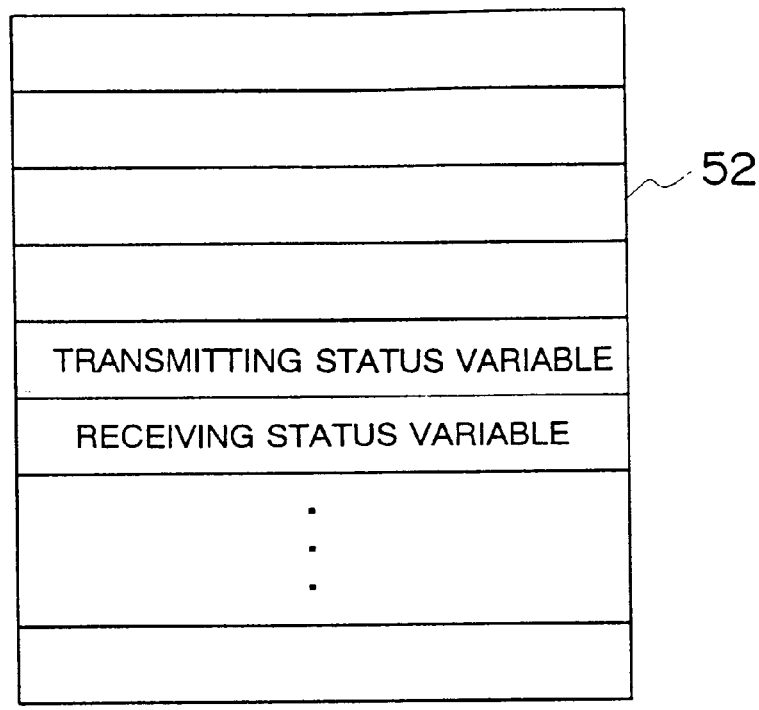
FIG. 10 is a structural view of the continuous number management table shown in FIG. 4.

FIG. 10 is a structural view of the continuous number management table 52. In FIG. 10, plural pairs of a transmitting status variable and a receiving status variable are stored in the continuous number management table 52. The transmitting status variable is a transmission number stored in the frame header storage area 26 (see FIG. 2) of the latest frame F transmitted from the frame relay switch 31 to the IWF 21. The receiving status variable is a reception number stored in the frame header storage area 26 of the latest frame F received by the frame relay switch 31 from the IWF 21. Each pair stored in the continuous number management table 52 is stored in relation with the transmitted frame relay network number and the DLCI number, and is retrieved by using the frame relay network number and the DLCI number as retrieval keys.

Figure 11:
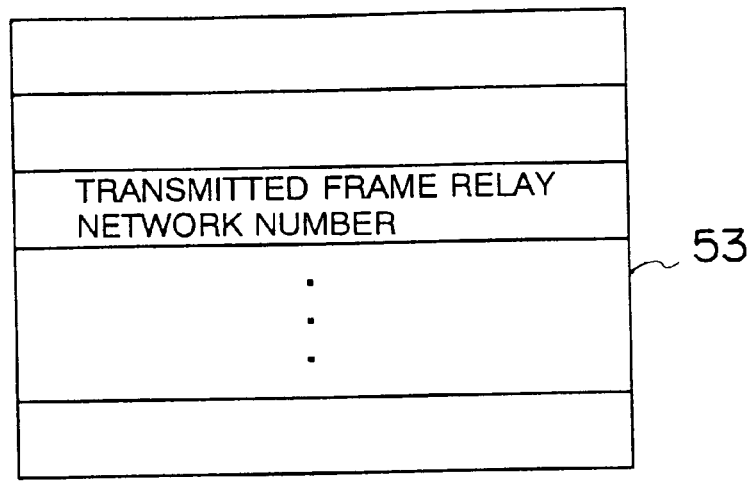
FIG. 11 is a structural view of the frame relay network number retrieval table shown in FIG. 4.

FIG. 11 is a structural view of the frame relay network number retrieval table 53. In FIG. 11, plural frame relay network number are stored in the frame relay network number retrieval table 53. Each frame relay network number is a frame relay network number (transmitted frame relay network number) corresponding to a DLCI number between the frame relay network FR1, FR2 and each IWF 21, and can be retrieved by the DLCI number.

The frame transmission processing part 56 shown in FIG. 4 starts to perform the following processes, when a frame F is transmitted from the frame relay switch 31 to the IWF 21 and/or the ISDN circuit 23. That is, the frame transmission processing part 56 takes the DLCI number out from the core header storage area 27 (see FIG. 2) of a frame F to be transmitted. The frame transmission processing part 56 retrieves the frame relay network number retrieval table 53 (see FIG. 1) and detects the transmitted frame network number. The frame transmission processing part 56 retrieves the backup status management table 47 (see FIG. 5) by using a transmitted frame number as a retrieval key and detects a connection status of the ISDN circuit 23 corresponding to the transmitted frame number. Then, the frame transmission processing part 56 determines whether the connections between the ISDN circuit 23 and the frame relay networks FR1, FR2 are completed or not. At that time, when the frame transmission processing part 56 determines that the connections between the ISDN circuit 23 and the frame relay networks FR1, FR2 are completed, a control signal for transmitting a frame F to the IWF 21 and the ISDN circuit 23 is transmitted to the CHCs 35a, 35b or the CHCs 35c, 35d and the circuit dealing unit 41. With this arrangement, the frame F is transmitted to the IWF 21 and the ISDN circuit 23 via a suitable circuit (physical channel, logical channel). On the contrary, when the frame transmission processing part 56 determines that the connection between the frame relay networks FR1, FR2 and the ISDN circuit 23 is in a state except for completion, a control signal for transmitting a frame F to the IWF 21 is transmitted to the CHCs 35a, 35b or the CHCs 35c, 35d and the circuit dealing unit 41. Additionally, the frame transmission processing part 56, before transmitting the above described control signal to the CHCs 35a, 35b or the CHCs 35c, 35d and the circuit dealing unit 41, informs the header editing part 57 of the transmitted frame F, the transmitted frame relay number and the DLCI number and makes the header editing part 57 start. Then, the frame transmission processing part 56, after finishing the process by the header editing part 57, transmits the above described control signal to the circuit dealing unit 41 and the like.

The header editing part 57 starts by receiving a notification from the frame transmission processing part 56, and performs the following process. That is, the header editing part 57 gives a frame header in front of the core header 27 (see FIG. 2) of the frame F. At that time, the header editing part 57 detects a transmitting status variable corresponding to the transmitted frame relay network number and the DLCI number, and stores a value which 1 is added to the variable in the transmission number storage area 26a as a transmission number. The header editing part 57 also stores the same number stored in the transmission number storage area 26a in the continuous number management table 52 as the transmitting status variable. The header editing part 57 also sets "0" to the congestion information storage area 26b. Moreover, the header editing part 57 detects a backup connection status similarly to the frame transmission processing part 56. At that time, when a detected result shows that the backup circuit connection is completed, "1" is set in the discard information storage area 26c of the frame header, and when the backup circuit connection is not completed, "0" is set in the discard information storage area 26c.

The frame reception processing part 55 starts by receiving a frame F in the frame relay switch 31 from the IWF 21, and performs the following process. That is, the frame reception processing part 55 determines whether the frame F is received from the IWF 21 or not, and gives a starting command to the quality information storage processing part 61 when the frame is received from the IWF 21. The frame reception processing part 55 also determines whether "1" is stored in the discard information storage area 26c of the frame received in the frame relay switch 31 or not. The frame reception processing part 55 discards the frame F when "1" is stored in the discard information storage area 26c.

The quality information storage processing part 61 starts by receiving the frame F from the frame reception processing part 55, and performs the following process. That is, the quality information storage processing part 61 takes the transmission number stored in the transmission number storage area 26a of the transmitted frame F out. Then, the quality information storage processing part 61 detects a receiving status variable corresponding to the frame relay network number and the DLCI number of the received frame F in the continuous number management table 52 (see FIG. 10). The quality information storage processing part 61 obtains a number of frames F discarded in the ATM network 20 (a number of discarded frames) by using the obtained transmission number and the receiving status variable. The quality information storage processing part 61 retrieves the quality information collection table 49 (see FIG. 7), adds the obtained number of the discarded frames to the number of the ATM network discarded frames corresponding to the frame relay network number and the DLCI number of the frame F. Moreover, the quality information storage processing part 61 determines whether "1" is stored in the congestion information storage area 26b of the frame F or not. At that time, the quality information storage processing part 61, when "1" is stored in the congestion information storage area 26b, retrieves the quality information collection table 49, and adds 1 to the ATM network congestion notification reception frequency corresponding to the frame relay network number and the DLCI of the frame F.

The quality condition analyzing part 58 is set so as to start periodically, and performs the following process. That is, the quality condition analyzing part 58, every transmitted frame relay network and DLCI (data link), detects a number of ATM network discarded frames and a frequency of ATM network congestion notification reception, which the number and the frequency are stored in the quality information collection table 49 (see FIG. 7), and adds the number of ATM network discarded frames and the frequency of ATM network congestion notification reception to a corresponding total of ATM network discarded frames and a corresponding total of ATM network congestion notification reception in the quality information cumulative table 50 (see FIG. 8), respectively.

The quality condition analyzing part 58, every transmitted frame relay network and DLCI (data link), also detects the number of ATM network discarded frames, which the number is stored in the quality information collection table 49 (see FIG. 7), and detects the discard frequent occurrence threshold corresponding to the number of ATM network discarded frames in the threshold storage table 51 (see FIG. 9). Then, the quality condition analyzing part 58 compares the number of ATM network discarded frames and the discard frequent occurrence threshold, and, when the number of ATM network discarded frames is over the discard frequent occurrence threshold, informs that effect, the transmitted frame relay network number and the DLCI number of the caution output part 60 so as to make the caution output part 60 start.

The quality condition analyzing part 58, every transmitted frame relay network and DLCI (data link), also detects the frequency of ATM network congestion notification reception, which the frequency is stored in the quality information collection table 49, and detects the discard frequent occurrence threshold corresponding to the frequency of ATM network congestion notification reception in the threshold storage table 51. Then, the quality condition analyzing part 58 compares the frequency of ATM network congestion notification reception with the reception frequent occurrence threshold, and, when the frequency of ATM network congestion notification reception is over the reception frequent occurrence threshold, informs that effect of the caution output part 60 so as to make the caution output part 60 start.

The quality condition analyzing part 58, every frame relay network, also detects a connection status of a backup circuit (ISDN circuit 23), which the connection status is stored in the backup status management table 47 (see FIG. 5), and determines whether the connection of the backup circuit is completed or not. Then, the quality condition analyzing part 58, when determining that the connection of the backup circuit is not completed, accumulates the number of ATM network discarded frames and the frequency of ATM network congestion notification reception, which the number and the frequency are stored in relation to all DLCIs (numbers) set for the transmitted frame relay network. The quality condition analyzing part 58 detects the first connection threshold and the second connection threshold in the threshold management table 48 (see FIG. 6). The quality condition analyzing part 58 compares the cumulative number of ATM network discarded frames with the first connection threshold, and compares the cumulative frequency of ATM network congestion notification reception with the second connection threshold. The quality condition analyzing part 58, when determining that the cumulative number of ATM network discarded frames is over the first connection threshold or the cumulative frequency of ATM network congestion notification reception is over the second connection threshold, informs a message for connecting the backup circuit (backup connection message) of the backup processing part 59 so as to make the backup processing part 59 start.

The quality condition analyzing part 58 determines whether the connection of the backup circuit is completed or not with the above described method. When it is determined that the connection of the backup circuit is completed, the quality condition analyzing part 58 accumulates the number of ATM network discarded frames and the frequency of ATM network congestion notification reception, which the number and the frequency are stored in relation to all DLCIs (numbers) set correspondingly to the transmitted frame relay network in the quality information collection table 49. Then, the quality condition analyzing part 58 detects the first disconnection threshold and the second disconnection threshold in the threshold management table 48 (see FIG. 6). The quality condition analyzing part 58 compares the cumulative number of ATM network discarded frames with the first disconnection threshold, and compares the cumulative frequency of ATM network congestion notification reception with the second disconnection threshold. The quality condition analyzing part 58, when it is determined that the cumulative number of ATM network discarded frames is lower than the first disconnection threshold and the cumulative frequency of ATM network congestion notification reception is lower than the second disconnection threshold, informs a message for disconnecting the backup circuit (backup disconnection message) of the backup processing part 59 so as to make the backup processing part 59 start.

The quality condition analyzing part 58 also makes the number of ATM network discarded frames and the frequency of ATM network congestion notification reception stored in the quality information collection table 49 zero-clear.

The caution output part 60 starts by receiving a notification from the quality condition analyzing part 58. The caution output part 60 outputs a caution massage to the DLCI of the transmitted frame network which is determined that the number of ATM network discarded frames is over the discard frequent occurrence threshold or the frequency of ATM network congestion notification reception is over the reception frequent occurrence threshold by the quality condition analyzing part 58.

The backup processing part 59 starts by receiving a backup connection message or a backup disconnection message from the quality condition analyzing part 58. When the backup processing part 59 starts by receiving a backup connection message from the quality condition analyzing part 58, it performs the connection process of the backup circuit in accordance with the switch procedure of the ISDN circuit 23. Then, the backup processing part 59, when the connection of the backup circuit is completed, retrieves the backup status management table 47 (see FIG. 5) and sets the backup connection status stored in relation to the transmitted frame relay network number to "1" showing the connection completion of the backup circuit. On the contrary, when the backup processing part 59 starts by receiving a backup disconnection message from the quality condition analyzing part 58, it performs the disconnection process of the backup circuit in accordance with the switch procedure of the ISDN circuit 23. At that time, the backup processing part 59, at the beginning of the disconnection process of the backup circuit, retrieves the backup status management table (see FIG. 5) and sets the backup connection status stored in relation to the transmitted frame relay network number to "0" showing except for the connection completion of the backup circuit.

The command receiving part 63 receives various operational maintenance commands for the frame relay switch 31 inputted from the system console 38. Then, the command receiving part 63, when a command for changing each threshold stored in the threshold management table or the threshold storage table 51 and a new threshold are inputted, informs the quality information management processing part 62 of that effects.

The quality information management processing part 62 starts by receiving a notification from the command receiving part 63. The quality information management processing part 62 newly sets the threshold received from the command receiving part 63 in a corresponding area of the threshold management table 48 or the threshold storage table 51.

Figure 12:
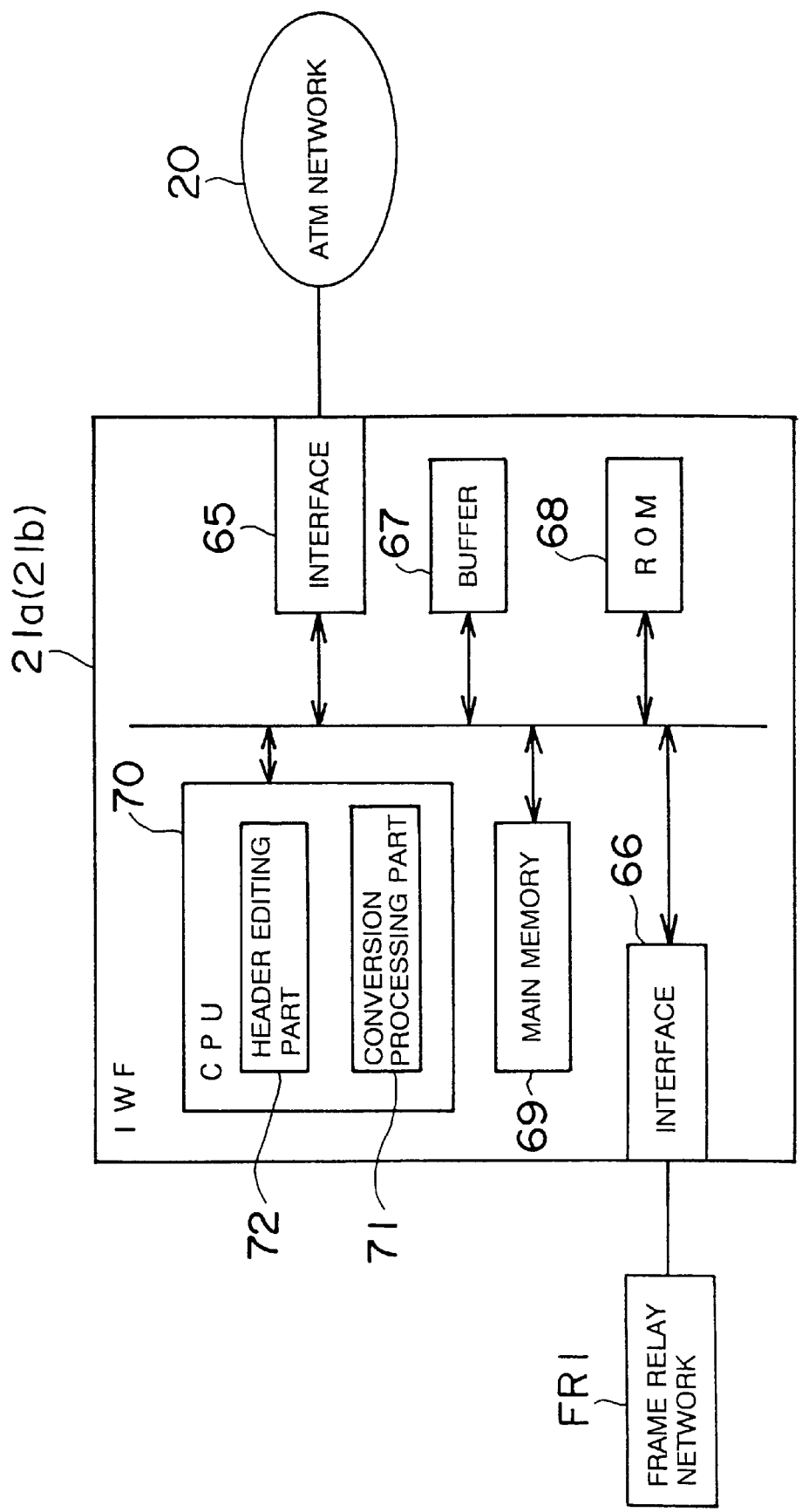
FIG. 12 is a circuit structural view of the IWF shown in FIG. 4.

FIG. 12 is a block diagram showing a circuit structure of the IWF 12. Two IWFs 21 shown in FIG. 1 are same structures. Here, an explanation will be given of the IWF 21 provided between the frame relay network FR1 and the ATM network 20 as a sample. In FIG. 12, the IWF 12 is provided with plural interfaces 65, 66, a buffer in which the frame F and the ATM cell S received via the interfaces 65, 66 are accumulated, a ROM (Read Only Memory) 68 in which control programs for respective parts in the IWF 21 and data are stored, a main memory 69 in which the control programs stored in the ROM are loaded, and a CPU 70 performing the control programs loaded in the main memory 69. Moreover, the control programs are performed in the CPU 70, whereby the CPU 70 functions as an conversion processing part 71 and a header editing part 72.

The interface 65 accepts a circuit for connecting the IWF 21 with the ATM network 20 to transmit ATM cells S to the ATM network 20 and to receive ATM cells from the ATM network 20. On the other side, the interface 66 accepts a frame relay circuit for connecting the IWF 21 with the frame relay network FR1 to receive frames F from the frame relay network FR1 and to transmit frames F to the frame relay network FR1.

The conversion processing part 71 disassembles a frame F received from the frame relay network FR1 to ATM cells S and assembles ATM cells received from the ATM network 20 to a frame F. The ATM cell S is provided with a cell header and a data part 76, as shown in the structural view of FIG. 13. A PT (Payload Type) displaying an existence of a congestion notification is stored in the cell header 75, and the congestion notification (EFCI) is set in the PT when a congestion occurs in the ATM network 20. Additionally, the data part 76 is an area for storing user data.

Figure 14:
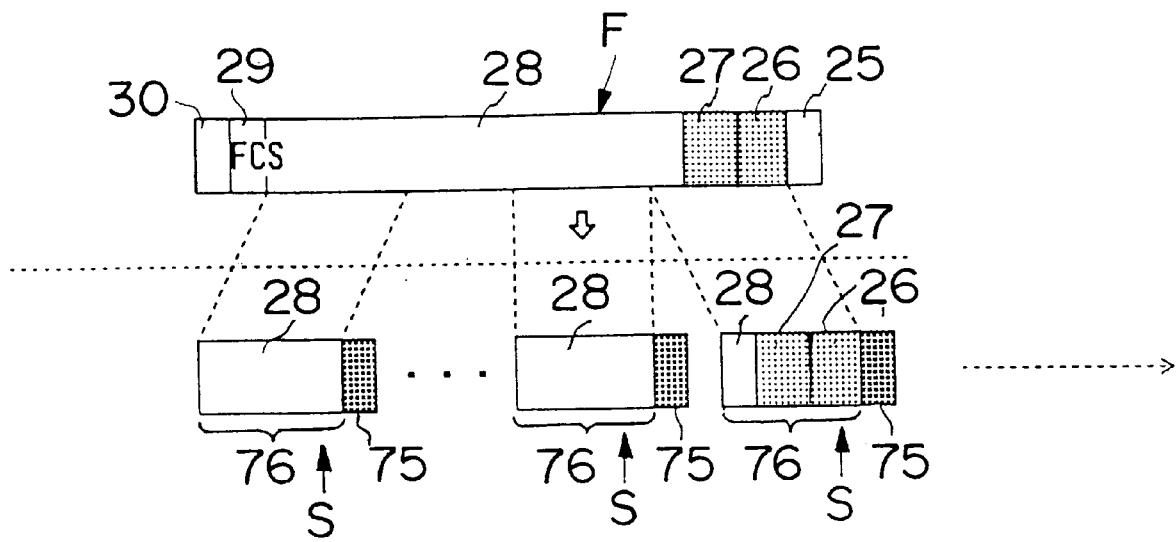
FIG. 14 is an explanatory view of the frame/ATM cell conversion by the IWF shown in FIG. 11.
Figure 14:
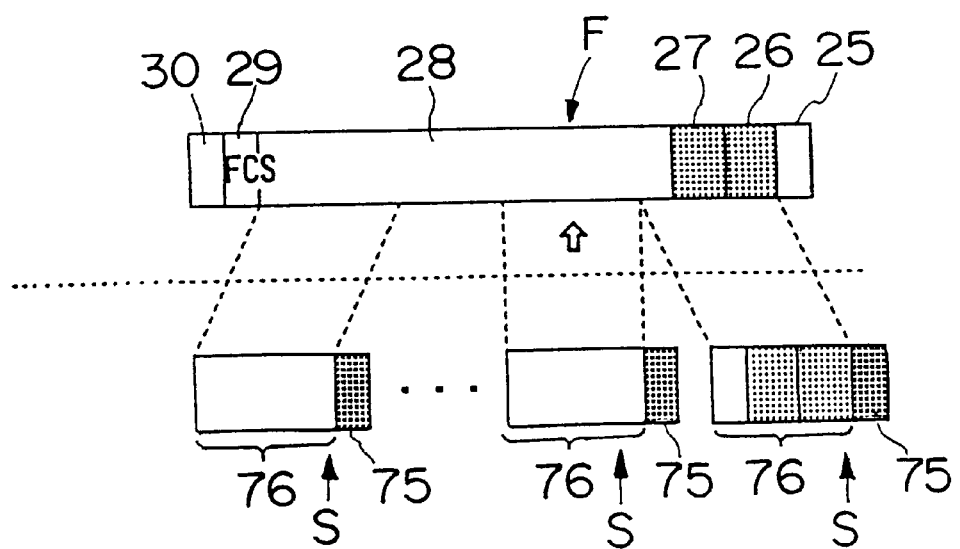

The conversion processing part 71, when the frame F is received by the IWF 21, divides a part from the frame header to the data part of the received frame F into plural parts (cells) as shown FIG. 14(a), and adds cell headers 75 to the respective parts (cell) to produce plural ATM cells S, whereby the conversion processing part 71 performs the transmission process from the interface 65 to the ATM network 20.

On the contrary, the conversion processing part 71, when the IWF 21 receives plural ATM cells S enough to form one frame F from the ATM network 20, as shown in FIG. 14(b), extracts only the data parts 76 from the plural received ATM cells S, assembles these data parts 76 to form a part from the frame header to the data part of the frame F, adds the respective flags 25, 30 and the FCS to this part to form a frame F completely, and then transmits the frame F from the interface 66 to the frame relay network FR1.

The header editing part 72 starts when the conversion processing part 71 assembles a frame F from plural ATM cells S, refers to the PT in the cell header 75 of the ATM cell S, and stores "1" showing that there is a congestion notification from the ATM network 20 when the PT is set to the EFCI.

An explanation will be given of an operational sample of the network system having the above described structure with reference to flow charts shown in FIGS. 15–22.

First, an explanation will be given of the operational sample in a case that a frame F is transmitted from one of the terminals 22a to one of the terminals 22b as a transmitted terminal (namely, in a case that the frame relay network FR2 is used as the transmitted frame relay network) with reference to FIGS. 15–17.

Assumed that a frame F transmitted from one of the terminals 22a (transmitting terminal) is received by the frame relay network FR1 (frame relay switch 31b or frame relay switch 31c). In the frame relay network FR1, the frame F is received by the frame relay switch 31a connected with the IWF 21a via the frame relay switch 31b or the frame relay switch 31c. In this frame relay switch 31, the frame transmission processing part 56 starts when the frame F is transmitted to the IWF 21.

Figure 15:
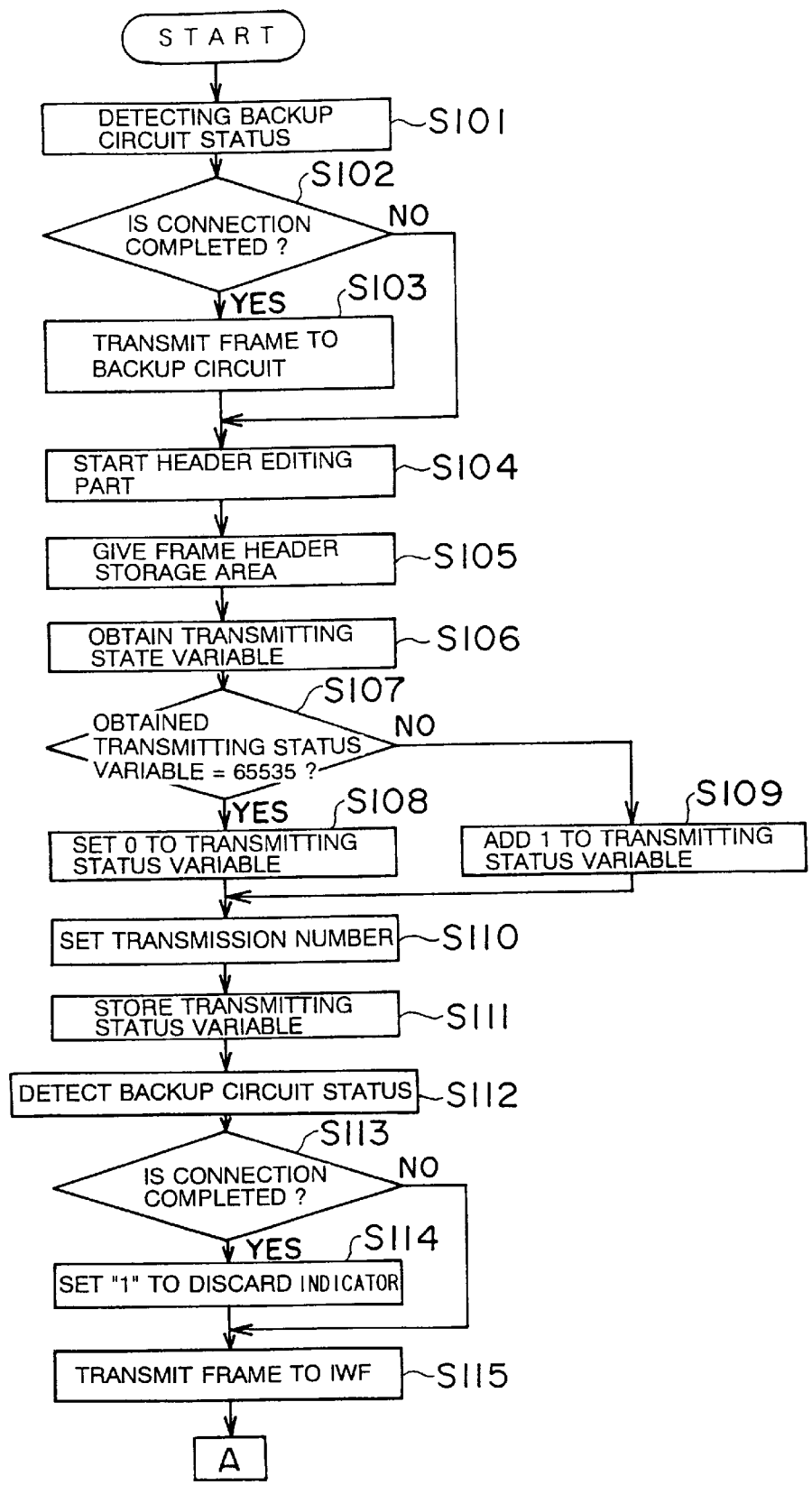
FIG. 15 is a flow chart illustrating an operational sample of the network system shown in FIG. 1.

As shown in FIG. 15, first, the frame transmission processing part 56, with the above described method, detects the connection status of the ISDN circuit 23 (backup circuit) corresponding to the transmitted frame relay network number (the network number of the frame relay network FR2) for the frame F to be transmitted <step S101>.

Then, the frame transmission processing part 56 determines whether the connections between the ISDN circuit 23 to be a backup circuit and the frame relay networks FR1, FR2 are completed or not <step S102>. At that time, when the frame transmission processing part 56 determines that the connections between the frame relay networks FR1, FR2 and the ISDN circuit 23 are completed, the frame transmission processing part 56 advances the operation to the step S103. When the frame transmission processing part 56 determines that the connections between the frame relay networks FR1, FR2 and the ISDN circuit 23 are in a state except for completion, the frame transmission processing part 56 advances the operation to the step S104.

When the operation is advanced to the step S103, the frame transmission processing part 56 lets the CHCs 35a, 35b and the circuit dealing unit 41 have a control signal for transmitting a frame F to the ISDN circuit 23. With this arrangement, the frame is transmitted to the ISDN circuit through a suitable circuit (physical channel, logical channel). Then, the frame transmission processing part 56 advances the operation to the step S104.

When the operation is advanced to the step S104, the frame transmission processing part 56 informs the header editing part 57 of the transmitted frame, the transmitted frame relay number and the DLCI number. With this arrangement, the header editing part 57 starts.

The header editing part 57 adds the frame header storage area 26 in front of the core header storage area 27 of the frame F (see FIG. 2), and makes the respective values in the frame header storage area 26 zero-clears <step S105>.

The header editing part 57 detects a transmission status variable corresponding to the transmitted frame relay network number and the DLCI number of the frame F in the continuous number management table 52 (see FIG. 10) <step S106>.

The header editing part 57 determines whether the transmission status variable obtained in the step S106 is 65535 which is the maximum value of 16 bits or not <step S107>. At that time, when the transmission status variable is 65535, the header editing part 57 restores the transmission status variable to 0 <step S108>, and when the transmission status variable is not 65535, the header editing part 57 adds 1 to the value obtained in the step S106 of the transmission status variable <step S109>.

The header editing part 57 stores the value obtained in the step S108 or in the step S109 of the transmission status variable in the transmission number storage area 26a of the frame F. With this arrangement, the transmission number of the frame F is set <step S110>.

The header editing part 57 stores a value, which is the same value stored in the transmission number storage area 26a in the step S110, in the continuous number management table 52 as a transmission status variable <step S111>.

The header editing part 57, similarly to the frame transmission processing part 56 in the step S101, detects the connection status of the backup circuit <step S112>, and determines whether the connection is completed or not <step S113>. Then, when the determined result in the step S113 is except for the connection completion of the backup circuit, the header editing part 57 advances the operation to the step S115.

On the contrary, when the determined result in the step S113 is that the connection of the backup circuit is completed, the header editing part 57 sets "1" in the discard information storage area 26c of the frame header <step S114>. Then, the header editing part 57 informs the frame transmission processing part 56 of the effect that the process as to itself is finished.

When the operation in the step 114 is finished, the frame transmission processing part 56 lets the CHCs 35b, 35c and the circuit dealing unit 41 have a control signal for transmitting a frame F to the IWF 21. With this arrangement, the frame F is transmitted to the IWF 21a <step S115>. When the step S115 is finished, the frame transmission processing part 56 stops the operation.

Figure 16:
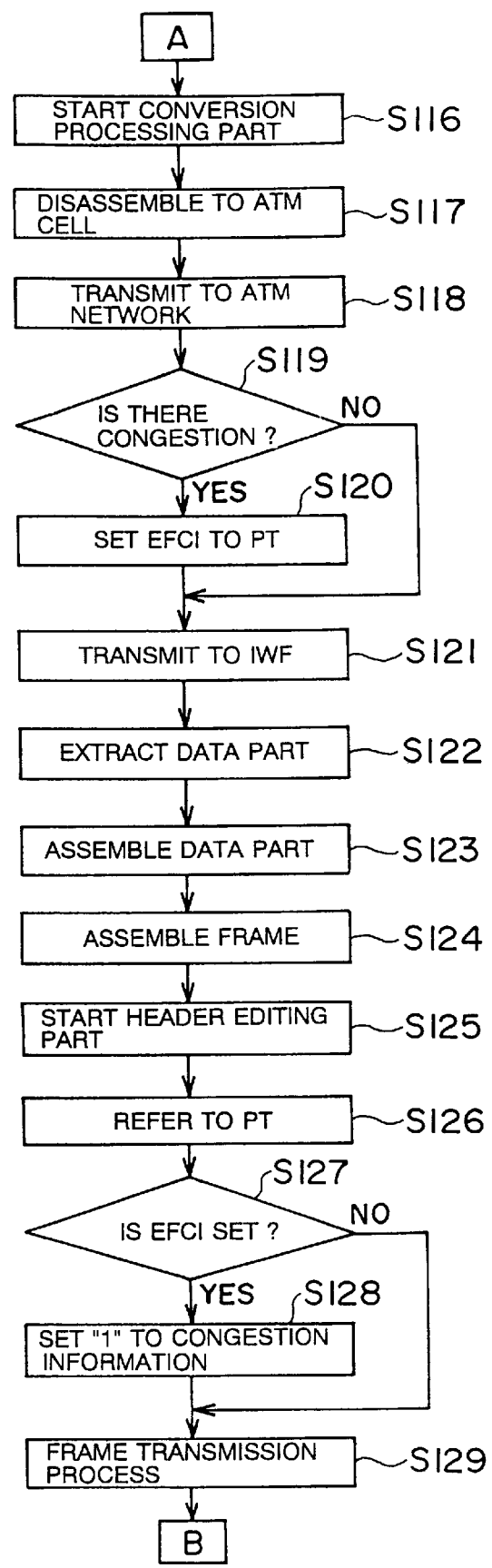
FIG. 16 is a flow chart illustrating an operational sample of the network system shown in FIG. 1.
Figure 17:
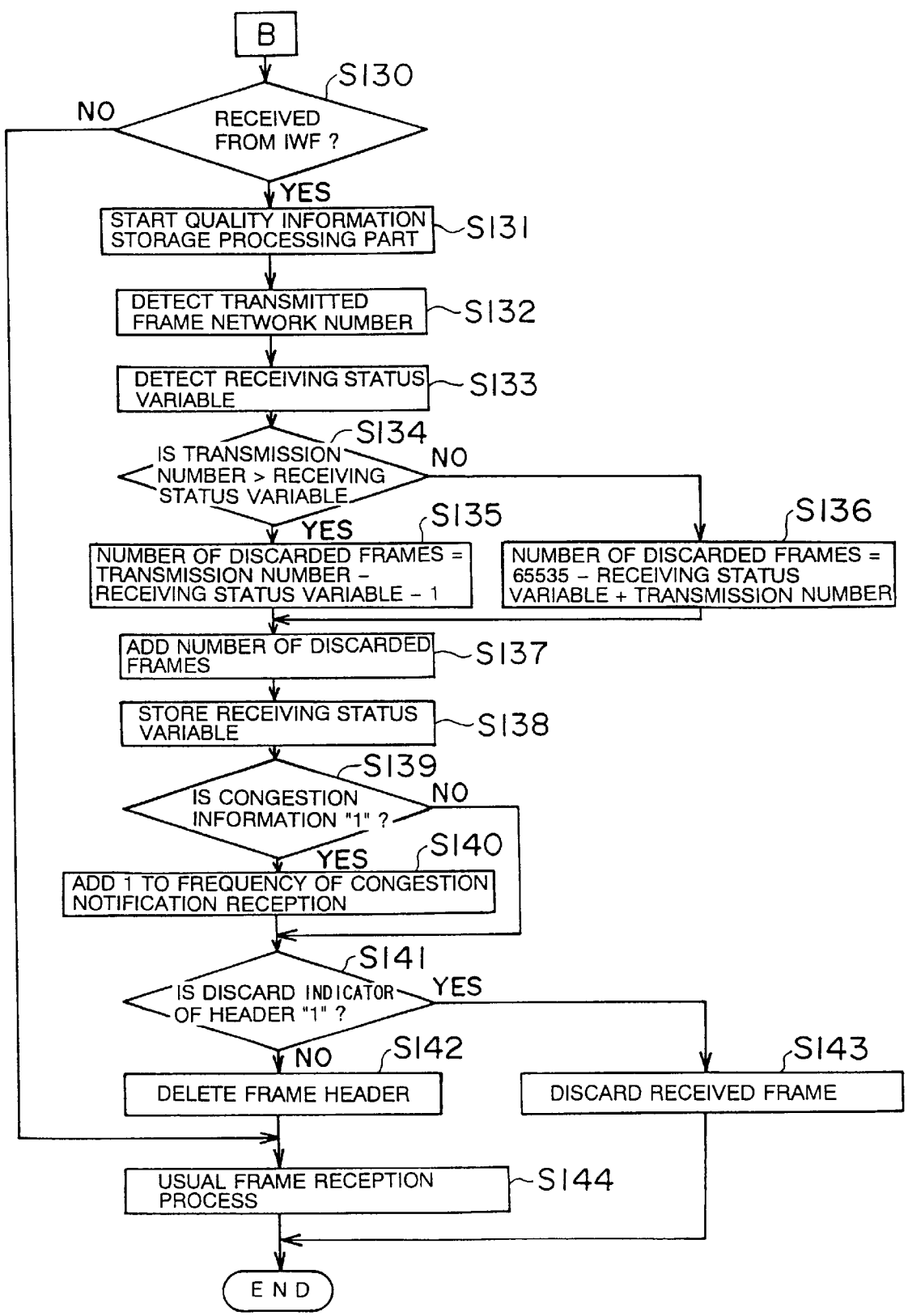
FIG. 17 is a flow chart illustrating an operational sample of the network system shown in FIG. 1.

As shown in FIG. 16, when a frame F is received in the IWF 21a, the conversion processing part 71 starts <step S116>. The conversion processing part 71 disassembles the received frame F to plural ATM cells S <step S117>, transmits each ATM cell to the ATM network 20 <step S118>.

In the ATM network 20, it is determined whether there is a congestion in the ATM network 20 <step S119>, and when there is a congestion, a congestion notification (EFCI) is set into the PT (see FIG. 13) in the cell header 75 of each ATM cell S <step S120>. Then, the ATM network 20 transmits each ATM cell S to the IWF 21 connected with the frame relay network FR2 based on the contents in the cell header 75 <step S121>.

Then, when the IWF 21*b* receives plural ATM cells S enough to assemble a frame F, the conversion processing part 71 starts and extracts the data part 76 from each ATM cell S <step S122>. The conversion processing part 71 assembles each data part 76 extracted in the step S122 to assemble a part from the frame header to the data of the frame F <step S123>. Then, the conversion processing part 71 adds the head flag 25 to the head to be a part of the frame F assembled in the step S123 and adds the FCS and the tail flag 30 to the tail to be a part of the frame F, whereby a complete frame F is assembled <step S124>.

The conversion processing part 71 informs the header editing part 72 of the effect that the frame F is assembled, and starts the header editing part 72 thereby <step S125>. Then, the header editing part 72 refers the PT stored in the cell header 75 of the ATM cell <step S126>, and determines whether a congestion notification (EFCI) is set in the PT or not <step S127>. At that time, when the EFCI is not set in the PT, the header editing part 72 advances the operation to the step S129. When the EFCI is set in the PT, the header editing part 72 stores "1" showing that there is a congestion notification in the congestion information storage area 26*b* of the frame F <step S128>. Incidentally, the header edition part 72 performs no mapping of the EFCI to the FECN in the core header of the frame F as usual. Therefore, in the frame relay network FR2, it becomes possible to separately recognize a congestion notification from the frame relay network FR1 and a congestion notification from the ATM network 20. Then, the frame F is transmitted to the frame relay network FR2 <step S129>.

In the frame relay network FR2, when the frame F is received by the frame relay switch 31 connected with the IWF 21, the frame reception processing part 55 starts. As shown in FIG. 17, first, the frame reception processing part 55 determines whether the frame F, which is received, (received frame F) is received from the IWF 21 or not <step S130>. The frame reception processing part 55, when it is determined that the received frame F is received from the IWF 21, inputs the received frame F to the quality information storage processing part 61 as a starting command and advances the operation to the step S131. On the contrary, the frame reception processing part 55, when it is determined that the received frame F is not received from the IWF 21, advances the operation to the step S144.

When the operation is advanced to the step S131, the quality information storage processing part 61 receives a frame F from the frame reception processing part 55 so as to start. First, the quality information storage processing part 61 takes the DLCI number out from the core header of the received frame F and detects the transmitted frame relay network number in the transmitted frame relay network number retrieval table 53 (see FIG. 11) <step S132>.

The quality information storage processing part 61 takes the transmission number stored in the transmitting number storage area 26*a* of the received frame F out. Then, the quality information storage processing part 61 detects the receiving status variable corresponding to the transmitted frame relay network number and the DLCI number of the received frame F, which the numbers are obtained in the step S132, in the continuous number management table 52 (see FIG. 10) <step S133>.

The quality information storage processing part 61 determines whether the transmission number obtained in the step S133 is over the receiving status variable obtained in the step S133 or not <step S134>. The quality information storage processing part 61, when the transmission number is larger than the receiving status variable, obtains a number of ATM network discarded frames by using the following (expression 1) <step S135>. Then, the operation is advanced to the step S137.

Number of ATM network discarded frames=Transmission Number−Receiving Status Variable−1    (expression 1)

On the contrary, the quality information storage processing part 61, when the transmission number is smaller than the receiving status variable, obtains a number of ATM network discarded frames by using the following (expression 2) <step S136>. Then, the operation is advanced to the step S137.

Number of ATM network discarded frames=65535−Transmission Number+Receiving Status Variable    (expression 2)

With the operation in the step S135 or in the S136, a number of discarded frames in the ATM network 20 is obtained.

Then, the quality information storage processing part 61 retrieves the quality information collection table 49 (see FIG. 7), and adds the number of ATM network discarded frames, which the number is obtained in the step 135 or in the step 136, to the number of ATM network discarded frames, which the number is stored in relation to the transmitted frame relay network number and the DLCI number of the received frame F <step S137>.

The quality information storage processing part 61 retrieves the continuous number management table 52, and stores the transmission number of the received frame F, which the transmission number is obtained in the step 133, in the storage area of the receiving status variable corresponding to the transmitted frame relay network number and the DLCI number <step S138>.

The quality information storage processing part 61 determines whether "1" is stored in the congestion information storage area 26*b* of the received frame F or not <step S139>. When "1" is not stored in the congestion information storage area 26*b*, the quality information storage processing part 61 finishes the operation, and shifts to the operation of the step S141 by the frame reception processing part 55. When "1" is stored in the congestion information storage area 26*b*, the quality information storage processing part 61 retrieves the quality information collection table 49, and adds 1 to a value of the frequency of ATM network congestion notification reception, which the value is stored in relation to the transmitted frame relay network number and the DLCI number of the received frame F <step S140>. Then, the quality information storage processing part 61 finishes the operation, and shifts to the operation of the step S141 by the frame reception processing part 55.

When the operation is advanced to the step S141, the frame reception processing part 55 determines whether "1" is stored in the discard information storage area 26*c* of the received frame F or not. When "1" is not stored in the discard information storage area 26*c*, the frame reception processing part 55 deletes the frame header storage area 26 of the received frame F <step S142>, and the operation is advanced to the step S144.

On the contrary, when "1" is stored in the discard information storage area 26*c*, the frame reception processing part 55 discards the received frame F <step S143>. With this arrangement, it is prevented that frames F are transmitted to the terminal 22*b* repeatedly.

When the operation is advanced to the step S144, the frame reception processing part 55 performs the usual reception process for the received frame F. Then, the frame reception processing part 55 stops the operation when the operation of the step 144 is finished.

Then, the frame F is transmitted to another frame relay switch 31 through the DLCI corresponding to the DLCI number, and finally received by the terminal 22b corresponding to the transmitting terminal.

Next, an explanation will be given of the operation in which the frame relay networks FR1, FR2 and the ISDN circuit 23 (backup circuit) are connected/disconnected as a second operational sample of this network system with reference to FIGS. 18–21.

Figure 18:
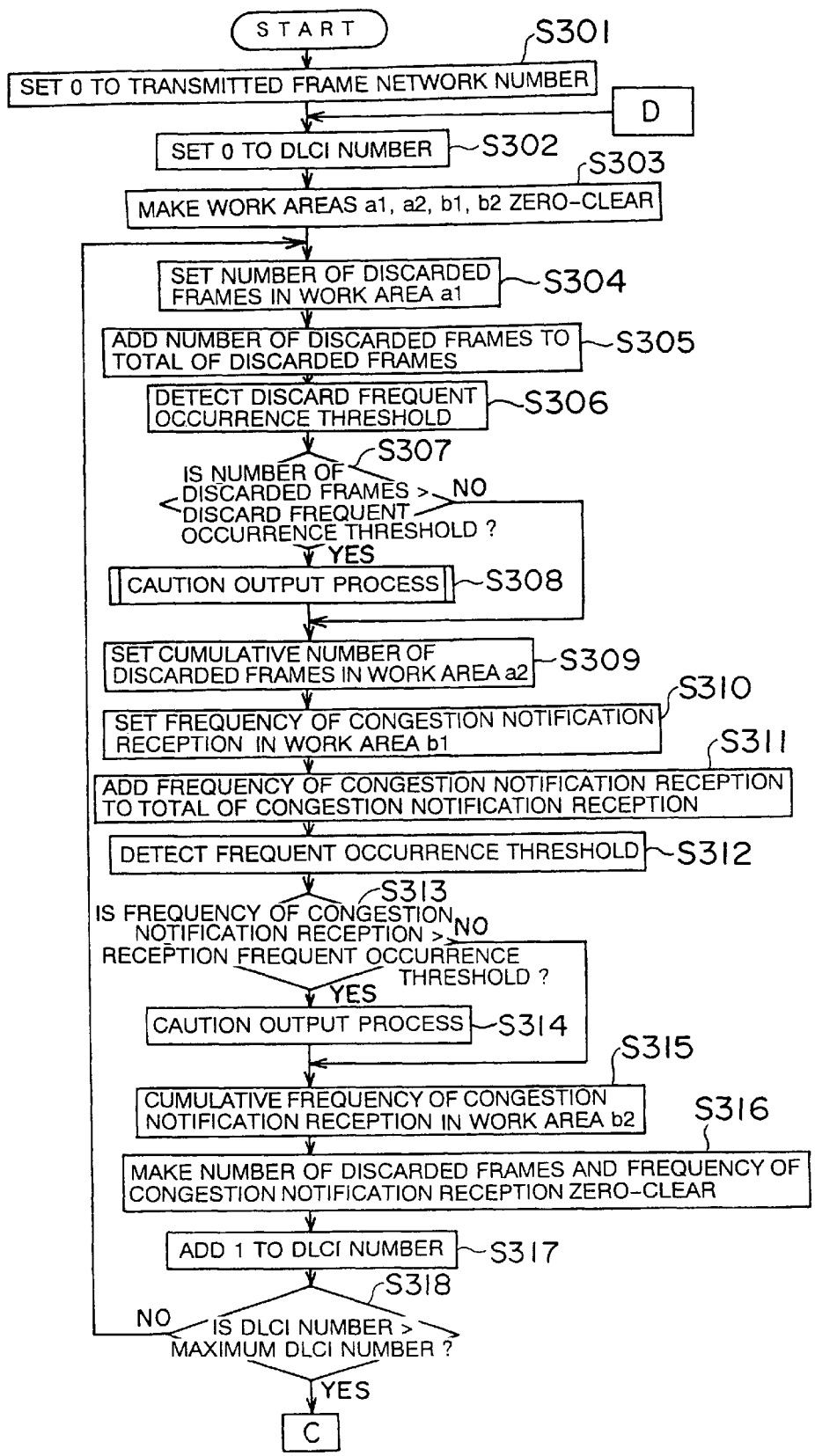
FIG. 18 is a flow chart illustrating an operational sample of the network system shown in FIG. 1.

The quality condition analyzing part 58 starts when this operation is performed. The quality condition analyzing part 58, as shown in FIG. 18, makes the transmitted frame network number 0 <step S301>, and makes the DLCI number 0 <step S302>. Then, the quality condition analyzing part 58 sets the transmitted frame network number and the DLCI number obtained in the steps S301 and S302 as retrieval keys. The quality condition analyzing part 58 makes the values of work areas a1, a2, b1 and b2 (not shown) set in the MMs 34a, 34b for its own process zero-clear <step S303>.

The quality condition analyzing part 58 retrieves the quality information collection table 49 (see FIG. 7) by using the retrieval keys set in the steps S301 and S302, detects the number of ATM network discarded frames, which the number is stored correspondingly to the retrieval key, and then sets the number in the work area a1 <step S304>.

The quality condition analyzing part 58 retrieves the quality information cumulative table 50 (see FIG. 8) by using the above mentioned retrieval keys, and adds the number of ATM network discarded frames, which the number is obtained in the step S304, to the total of ATM network discarded frames, which the total is stored correspondingly to the retrieval keys <step S305>.

The quality condition analyzing part 58 retrieves the threshold storage table 51 (see FIG. 9) by using the above mentioned retrieval keys, and detects the discard frequent occurrence threshold stored correspondingly to the retrieval keys <step S306>.

The quality condition analyzing part 58 determines whether the number of ATM network discarded frames, which the number is stored in the work area a1 in the step S304, is over the discard frequent occurrence threshold obtained in the step S306 or not <step S307>. When the number of ATM network discarded frames is over the discard frequent occurrence threshold, the quality condition analyzing part 58 informs the caution output part 60 of the effect that many frames are discarded, the transmitted frame relay network number and the DLCI number. Then, the operation is advanced to the step S308. On the contrary, when the number of ATM network discarded frames is smaller than the discard frequent occurrence threshold, the quality condition analyzing part 58 advances the operation to the step S309.

Figure 19:
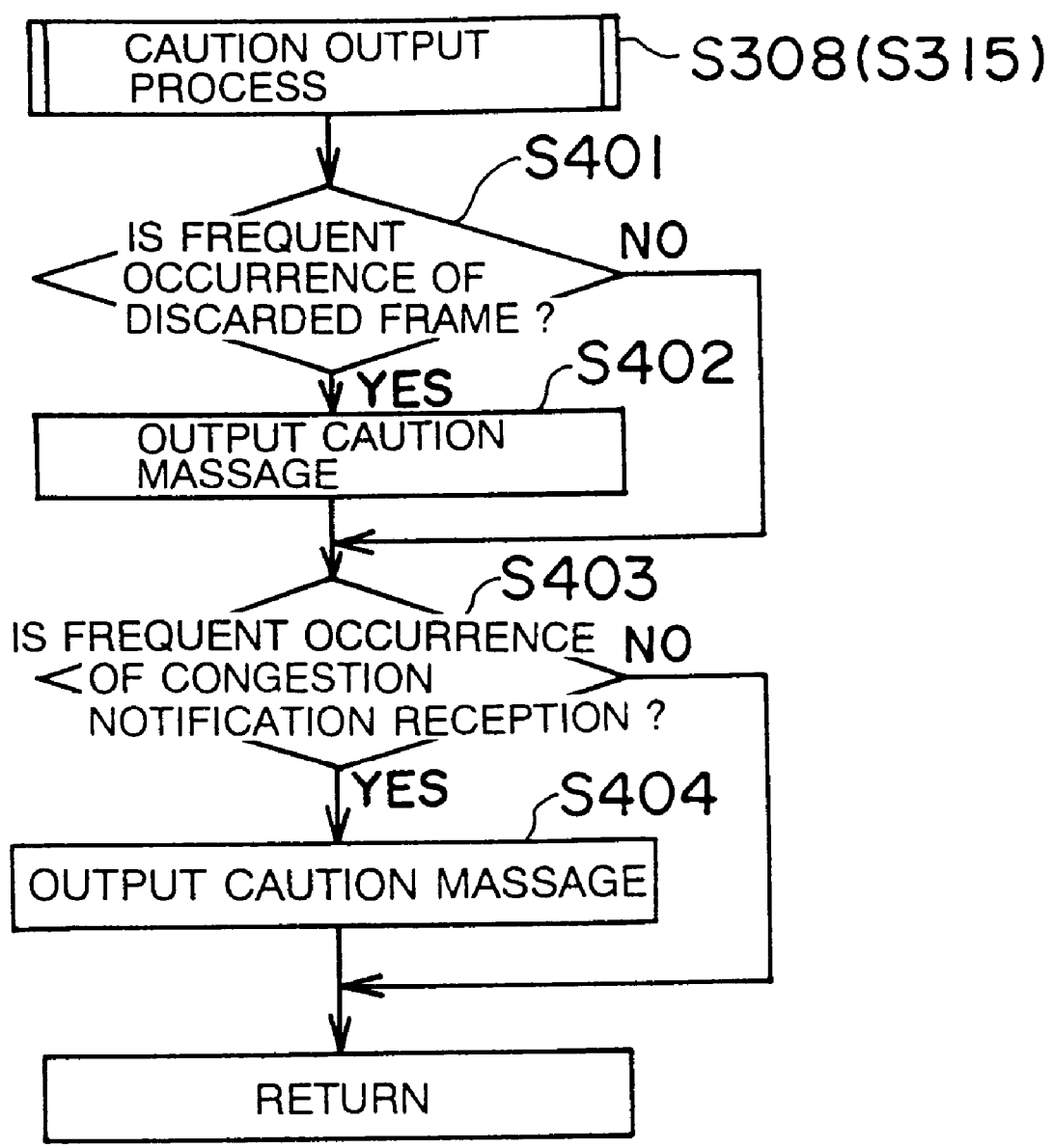
FIG. 19 is a flow chart illustrating an operational sample of the network system shown in FIG. 1.

When the operation is advanced to the step S308, the caution output part 60 performs the caution output process. Concretely, as shown in FIG. 19, the caution output part 60, first, determines whether a notification from the quality condition analyzing part 58 indicates a frame discard frequent occurrence or not <step S401>.

When the notification indicates the frame discard frequent occurrence, the caution output part 60 outputs a caution message, which many frames F are discarded, to the system console 38 in the ATM network 20 corresponding to the transmitted frame relay network number and the DLCI number which are inputted from the quality condition analyzing part 58 <step S402>. Then, the operation is returned to the step S309 by the quality condition analyzing part 58 via the step S403.

When the operation is advanced to the step S309, the number of ATM network discarded frames, which the number is stored in the work area a1 by the step S304, is added to the number of ATM network discarded frames, which the number is stored in the work area a2. That is, the accumulation of the number of ATM network discarded frame, which the number is stored in the quality information collection table 49, is stored in the work area a2. At the current time, since the work area a2 is made zero-clear in the step S303, a value that 0 is added to the number of ATM network discarded frames, which the number is set in the work area a1, is set in the work area a2.

The quality condition analyzing part 58 retrieves the quality information collection table 49 by using the above mentioned retrieval keys, and detects the frequency of ATM network congestion notification reception, which the frequency corresponds to the retrieval key. Then, the frequency of ATM network congestion notification reception is set in the work area b1 <step S310>.

The quality condition analyzing part 58 retrieves the quality information cumulative table 50 (see FIG. 8) by using the above mentioned retrieval keys, and adds the frequency of ATM network congestion notification reception, which the frequency is obtained in the step S310, to the total of ATM network congestion notification reception, which the total is stored correspondingly to the retrieval key <step S311>.

The quality condition analyzing part 58 retrieves the threshold storage table 51 by using the above mentioned retrieval key, and detects the reception frequent occurrence threshold stored correspondingly to the retrieval key <step S312>.

The quality condition analyzing part 58 determines whether the frequency of ATM network congestion notification reception, which the frequency is set in the work area b1 in the step S309, is over the reception frequent occurrence threshold obtained in the step S312 or not <step S313>. When the frequency of ATM congestion notification reception is over the reception frequent occurrence threshold, the quality condition analyzing part 58 informs the caution output part 60 of the status of the congestion notification reception frequent occurrence, the transmitted frame relay network number and the DLCI number. Then, the operation is advanced to the step S314. On the contrary, when the frequency of ATM congestion notification reception is smaller than the reception frequent occurrence threshold, the quality condition analyzing part 58 advances the operation to the step S315.

When the operation is advanced to the step S314, the caution output part 60 performs the caution output process. Concretely, as shown in FIG. 19, the caution output part 60 determines whether a notification from the quality condition analyzing part 58 indicates the congestion notification reception frequent occurrence or not via the step S401 <step S403>. At that time, when the notification indicates the congestion notification reception frequent occurrence, the caution output part 60 outputs a caution message that many congestion notifications are received to the system console 38 from the ATM network 22 corresponding to the transmitted frame relay network number and the DLCI number inputted from the quality condition analyzing part 58 <step S404>. Then, when the operation in the step S404 is finished, the operation returns to the step S315 by the quality condition analyzing part 58.

When the operation is advanced to the step S315, the frequency of ATM network congestion notification reception, which the frequency is stored in the work area b1 in the step S310, is added to the frequency of ATM network congestion notification reception, which the frequency is stored in the work area b2. That is, the accumulation of the frequency of ATM network congestion notification reception, which the frequency is stored in the quality information collection table 49, is set in the work area b2 every transmitted frame relay network and DLCI number. At the current time, since the work area b2 is made zero-clear in the step S303, a value that 0 is added to the frequency of ATM network congestion notification reception, which the frequency is set in the work area b1, is set in the work area b2.

The quality condition analyzing part 58 retrieves the quality information collection table 49 by using the above mentioned retrieval keys, and makes the number of ATM network discarded frames and the frequency of ATM network congestion notification reception, which the number and the frequency are stored correspondingly to the retrieval keys. At the same time, the set contents in the work areas a1, b1 are made zero-clear <step S316>.

The quality condition analyzing part 58 adds 1 to the DLCI number used as the retrieval key (at the current time, the DLCI number becomes 1 from 0) <step S317>. With this arrangement, the retrieval keys are varied in a manner that the transmitted frame relay network number becomes 0 and the DLCI number becomes 1.

The quality condition analyzing part 58 determines whether the value, to which 1 is added in the step S317, of the DLCI number is larger than the maximum value of the DLCI number corresponding to the transmitted frame network number 0 or not <step S318>. At that time, when the value of the DLCI number is larger than the maximum value of the DLCI number, the quality condition analyzing part 58 advances the operation to the step S319. On the contrary, when the value of the DLCI number is smaller than the maximum value of the DLCI number, the quality condition analyzing part 58 returns the operation to the step S304 and repeats the operation from the step S304 to the step S317. Then, when the operation is finally advanced to the step S319, the work area a2 is set with the cumulative value of the numbers of ATM network discarded frames, which the numbers correspond to all DLCI numbers belonging to the transmitted frame relay network number 0. The work area b2 is set with the cumulated value of the frequencies of ATM network congestion notification reception, which the frequencies correspond to all DLCI numbers belonging to the transmitted frame relay network number 0.

Figure 20:
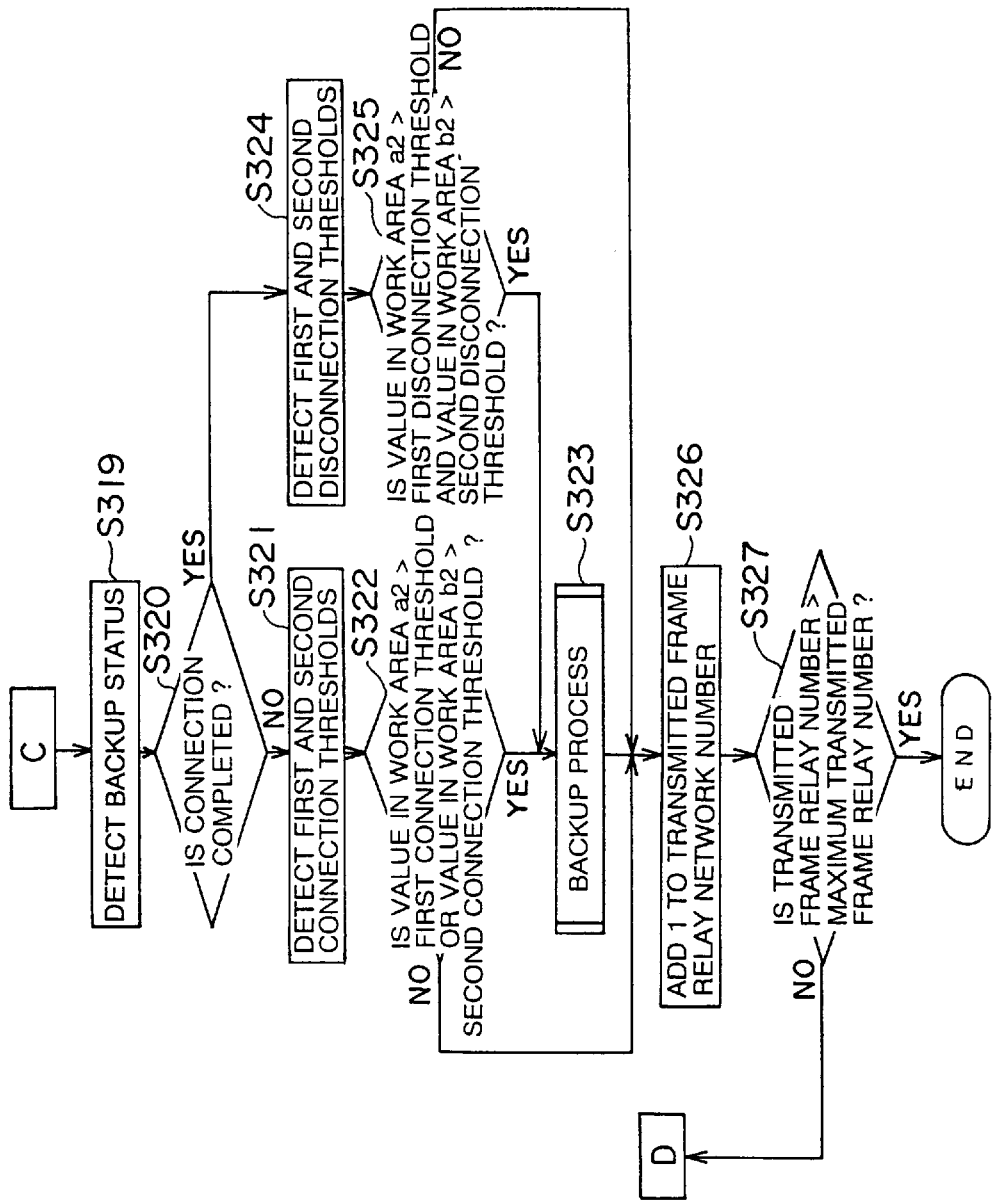
FIG. 20 is a flow chart illustrating an operational sample of the network system shown in FIG. 1.

As shown in FIG. 20, when the operation is advanced to the step S319, the quality condition analyzing part 58 retrieves the backup status management table 47 by using the transmitted frame relay network number 0 as the retrieval key, and detects the backup circuit number and the backup circuit connection status corresponding to the retrieval key.

The quality condition analyzing part 58 determines whether the backup circuit connection status is in the backup circuit connection completion or not <step S320>. When the backup circuit connection status is in a state except for the backup circuit connection completion, the quality condition analyzing part 58 advances the operation to the step S321. When the backup circuit connection status is in the backup circuit connection completion, the quality condition analyzing part 58 advances the operation to the step S324.

When the operation is advanced to the step S321, the quality condition analyzing part 58 retrieves the threshold management table 48 by using the transmitted frame relay network number 0 as the retrieval key, and detects the first connection threshold and the second connection threshold corresponding to the retrieval key.

The quality condition analyzing part 58 compares the value set in the work area a2 (the cumulative value of the numbers of ATM network discarded frames) with the first connection threshold, and compares the value set in the work area b2 (the cumulative value of the frequencies of ATM network congestion notification reception) with the second connection threshold. With this arrangement, the quality condition analyzing part 58 determines whether one of the cumulative values is over the threshold to be compared or not <step S322>.

When it is determined that the cumulative value of the numbers of ATM network discarded frames is over the first connection threshold or the cumulative value of the frequencies of ATM network congestion reception is over the second connection threshold, the quality condition analyzing part 58 informs the backup processing part 59 of the backup connection message. With this arrangement, the operation is advanced to the step S323, and the backup process is performed by the backup processing part 59. When it is determined that no cumulative value is over the threshold to be compared, the quality condition analyzing part 58 advances the operation to the step S326.

When the operation is advanced to the step S324, the quality condition analyzing part 58 retrieves the threshold management table 48 by using the transmitted frame relay network number 0 as the retrieval key and detects the first disconnection threshold and the second disconnection threshold corresponding to the retrieval key.

The quality condition analyzing part 58 compares the value set in the work area a2 (the cumulated value of the numbers of ATM network discarded frames) with the first disconnection threshold, and compares the value set in the work area b2 (the cumulated value of the frequencies of ATM network congestion notification reception) with the second disconnection threshold. With this arrangement, the quality condition analyzing part 58 determines whether both the cumulated values are lower than the thresholds to be compared or not <step S325>.

When it is determined that the cumulative value of the numbers of ATM network discarded frames is lower than the first disconnection threshold and the cumulative value of the frequencies of ATM network congestion reception is lower than the second disconnection threshold, the quality condition analyzing part 58 inputs the backup disconnection message and the frame relay network number used as the retrieval key to the backup processing part 59. With this arrangement, the operation is advanced to the step S323, and the backup process is performed by the backup processing part 59. When it is determined that at least one of the cumulative values is not lower than the threshold to be compared, the quality condition analyzing part 58 advances the operation to the step S326.

Figure 21:
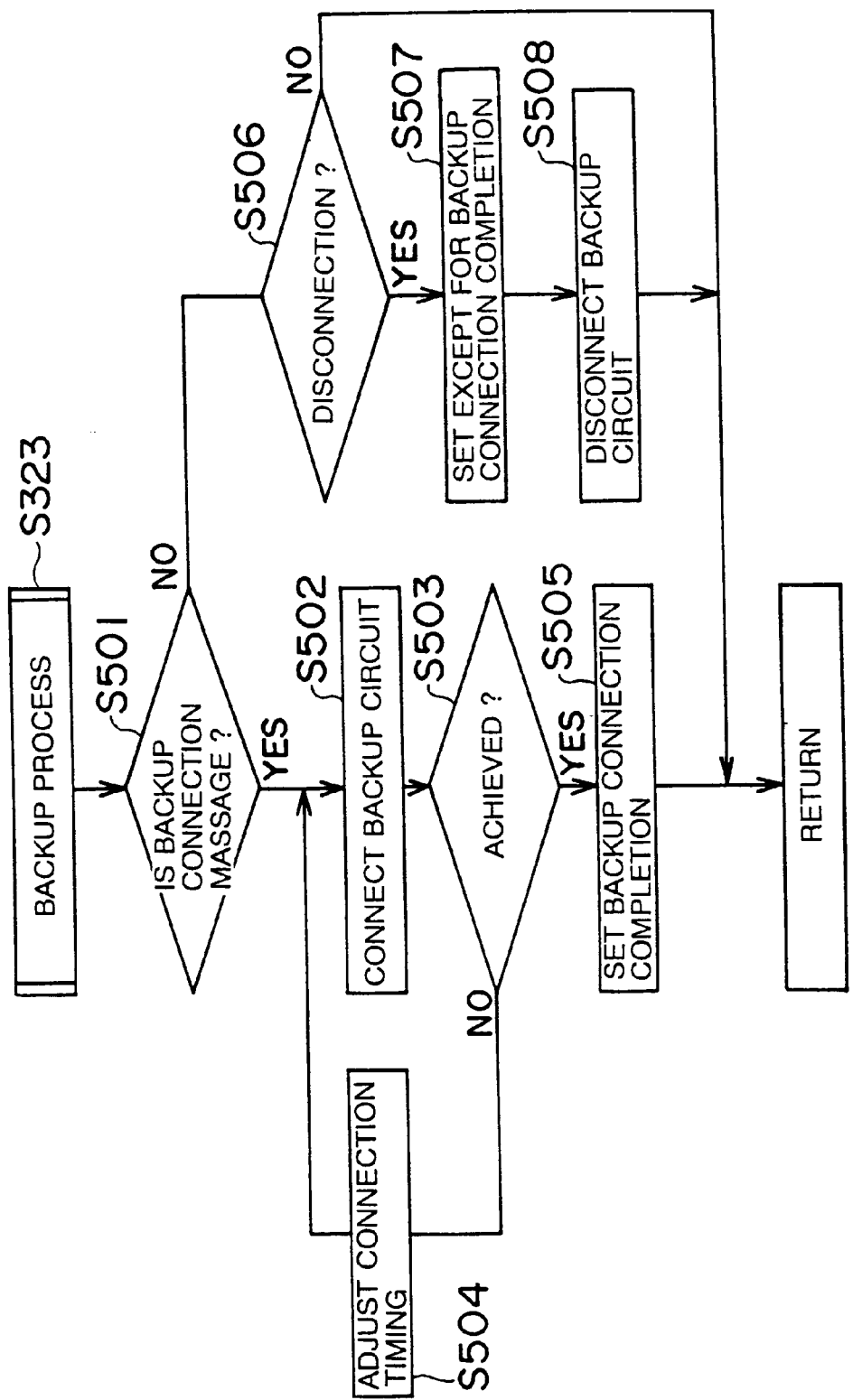
FIG. 21 is a flow chart illustrating an operational sample of the network system shown in FIG. 1.

When the operation is advanced to the step S323, the backup processing part 59 starts so as to perform the backup process shown in FIG. 21. That is, the backup processing part 59, first, determines whether the message inputted thereto is the backup connection message or not <step S501>. At that time, when it is determined that the message is the backup connection message, the backup processing part 59 advances the operation to the step S502. When it is determined that the message is not the backup connection message, the backup processing part 59 advances the operation to the step S506.

When the operation is advanced to the step S502, the backup processing part 59 connects the transmitted frame relay network corresponding to the transmitted frame relay network number which is inputted and the frame relay network belonging to itself by the ISDN circuit 23 in accordance with the switch procedure of the ISDN circuit 23.

Then, the backup processing part 59 determines whether the connection performed in the step S502 is achieved or not <step S503>. When it is determined that the connection is not achieved, the backup processing part 59 returns the operation to the step S502 while adjusting the connection timing <step S504>. The backup processing part 59 repeats the operation of the step S502 and the step S503 until it determined that the backup circuit connection is successes in the step S503. When it is determined that the backup circuit connection is successes, the backup processing part 59 advances the operation to the step S504.

When the operation is advanced to the step S505, the backup processing part 59 retrieves the backup status management table 47 by using the transmitted frame relay network number inputted thereto as the retrieval key, and sets the backup circuit connection status, which is stored correspondingly to the retrieval key, as the backup circuit connection completion. Then, the operation of the backup processing part 58 is finished, and the operation is returned to the step S326 by the quality condition analyzing part 58.

When the operation is advanced to the step S506, the backup processing part 59 determines whether the message inputted thereto is the backup disconnection message or not. When it is determined that the message is the backup disconnection message, the backup processing part 59 advances the operation to the step S507. On the contrary, when it is determined that the message is not the backup disconnection message, the operation of the backup processing part 58 is finished, and the operation is returned to the step S326 by the quality condition analyzing part 58. When the operation is advanced to the step S507, the backup processing part 59 retrieves the backup status management table 47 by using the transmitted frame relay network number inputted thereto as the retrieval key, and sets the backup circuit connection status stored correspondingly to the retrieval key in except for the backup circuit connection completion.

The backup processing part 59 disconnects the ISDN circuit 23 connecting the transmitted frame relay network corresponding to the transmitted frame relay network number which is inputted and the frame relay network belonging to itself in accordance with the switch procedure of the ISDN circuit 23 <step S508>. When the operation in the step S508 is finished, the operation of the backup processing part 59 is finished and the operation is returned to the step S326 by the quality condition analyzing part 58.

When the operation is advanced to the step S326, the quality condition analyzing part 58 adds 1 to the transmitted frame relay network number used as the retrieval key in the steps S319, S321 and so on. With this arrangement, the retrieval key is varied (at the current time, the transmitted frame network number is varied from 0 to 1).

Then, the quality condition analyzing part 58 determines whether the value of the transmitted frame relay network number which 1 is added in the step S326 is larger than the maximum value of the transmitted frame relay network number <step S327>. When the value of the transmitted frame relay network number is smaller than the maximum value, the quality condition analyzing part 58 returns the operation to the step S302 and repeats the operation from the step 302 to the step S326 until the transmitted frame relay number is over the maximum value in the step S327. Then, when it is determined that the frame relay number is over the maximum value, the operation of the quality condition analyzing part 58 is finished.

As above described, in this network system, the backup circuit is connected and disconnected periodically every transmitted frame relay network, and all storage contents in the quality information collection table 49 are once made zero-clear.

Figure 22:
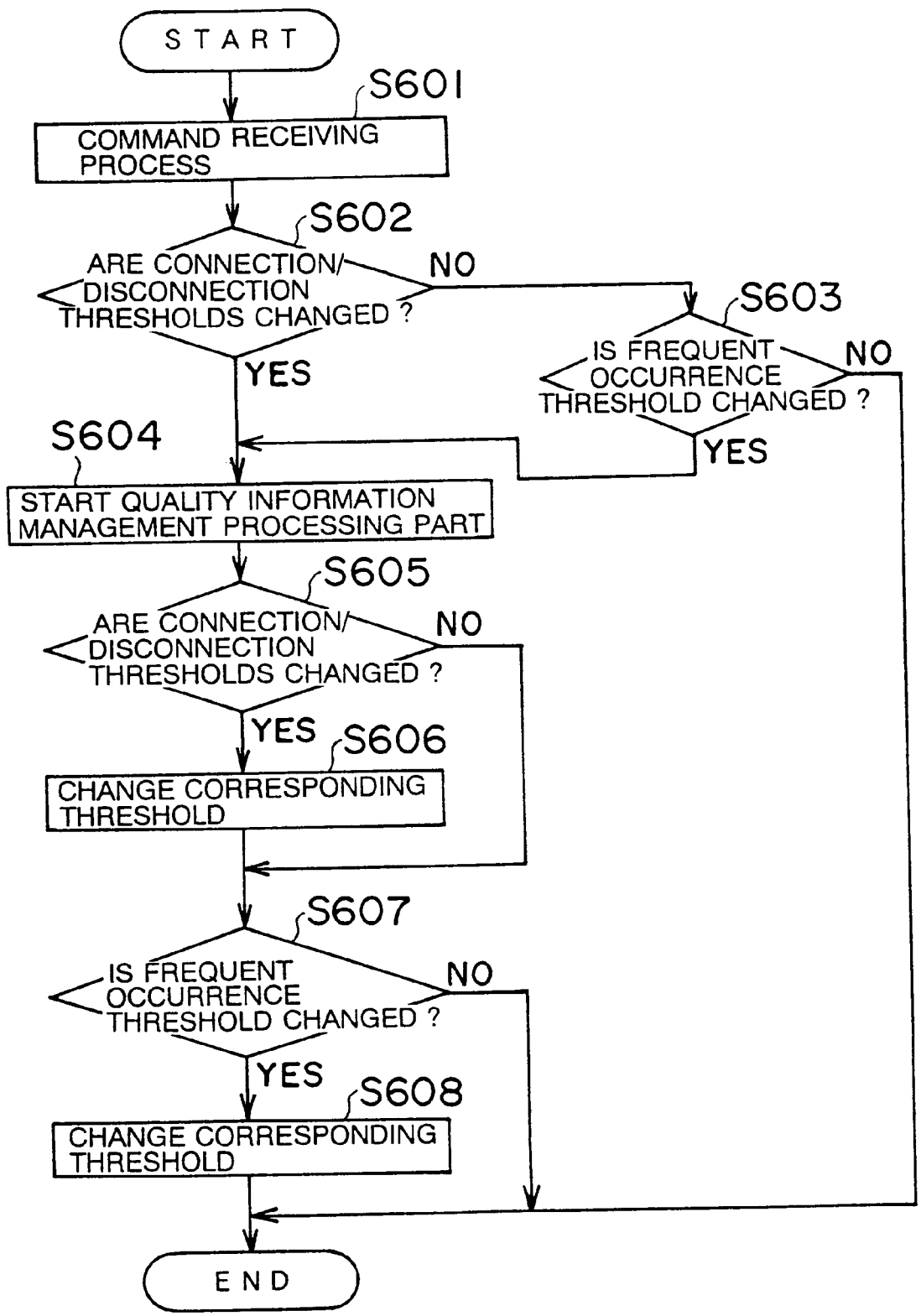
FIG. 22 is a flow chart illustrating an operational sample of the network system shown in FIG. 1.
Figure 23:
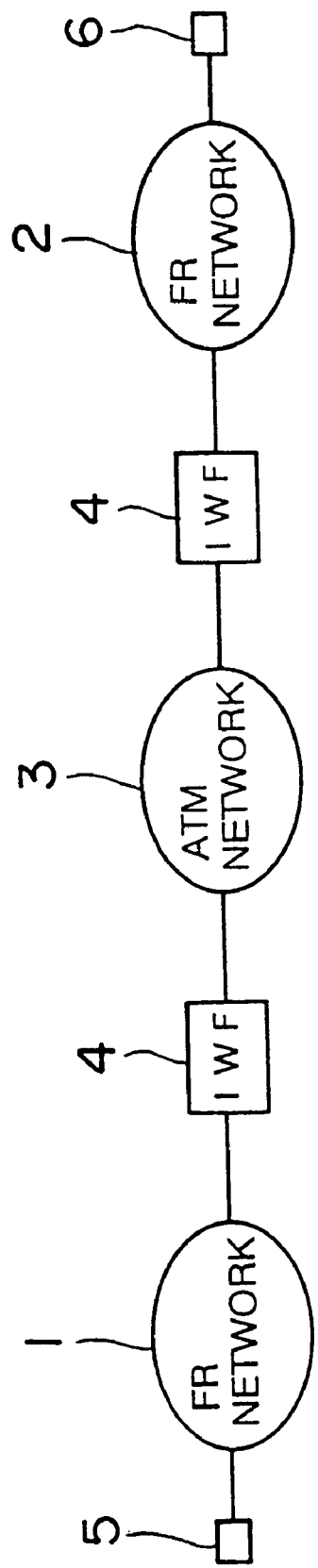
FIG. 23 is a schematic view illustrating a network system which a ATM network is used as a relay network.
Figure 24:
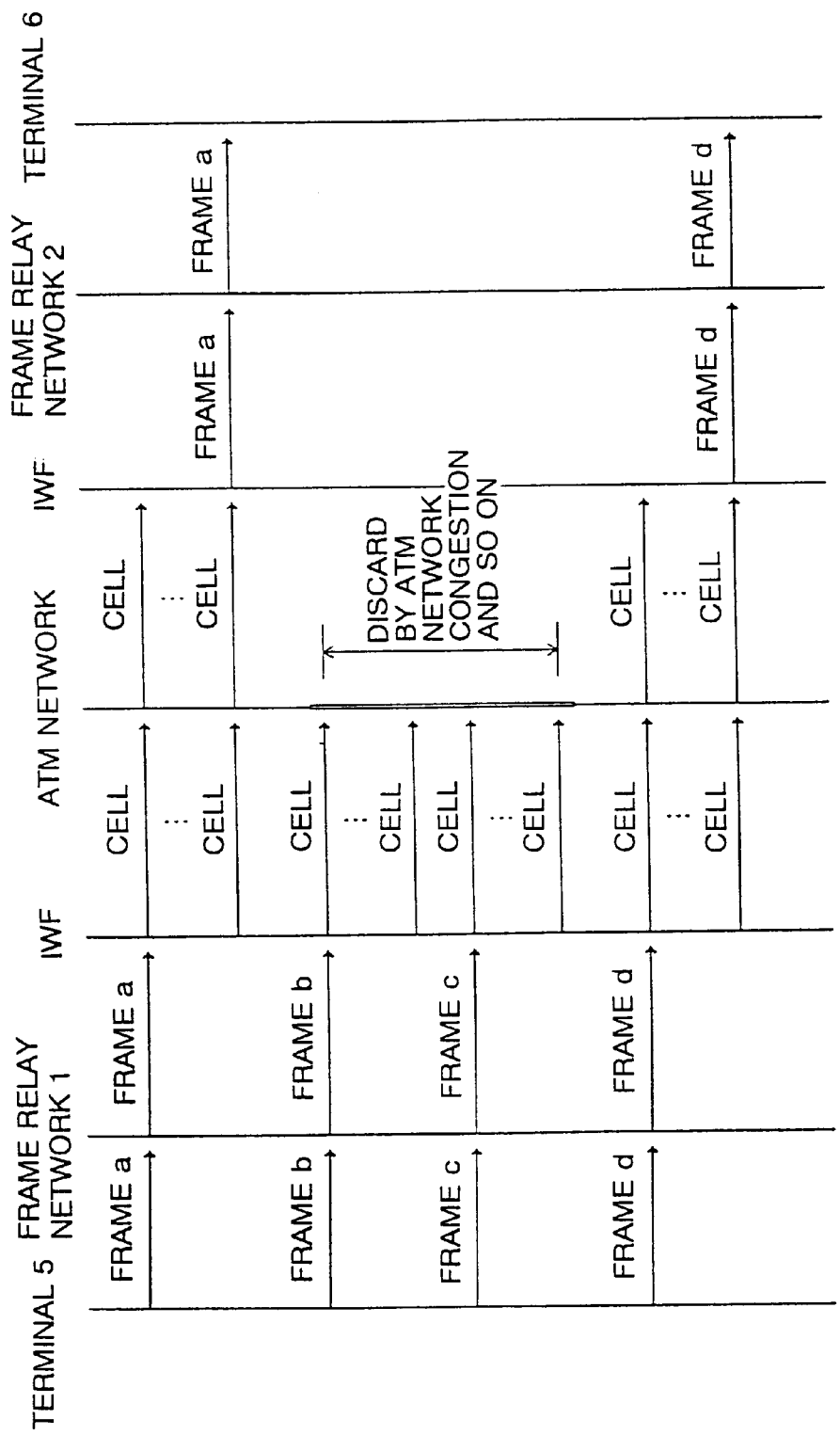
FIG. 24 is a view illustrating problems in a conventional network system.
Figure 25:
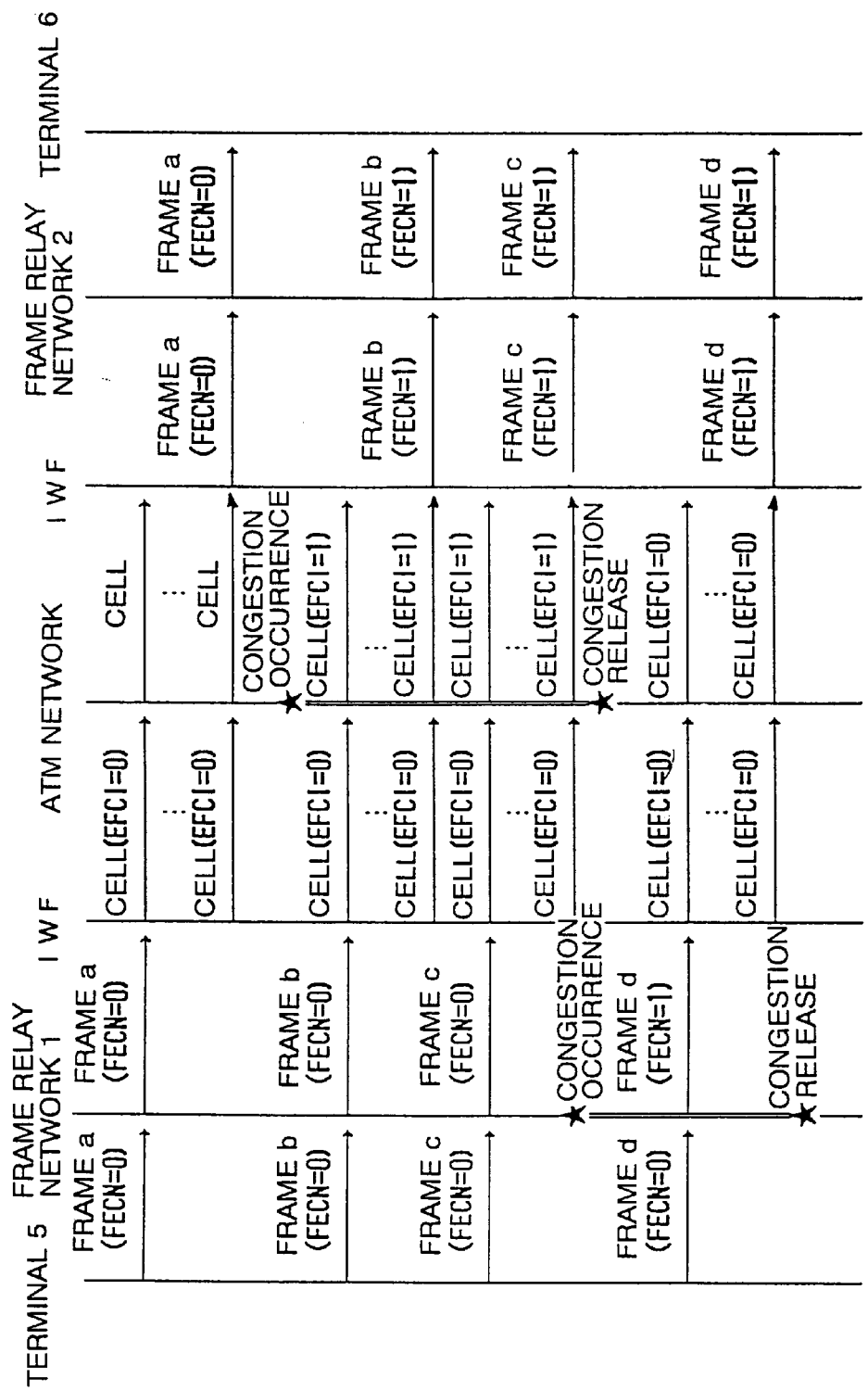
FIG. 25 is a view illustrating problems in a conventional network system.

Next, as the third operational sample in this network system, an explanation will be given of the operation in a case that the contents in the threshold management table 48 and the threshold storage table 51 of the frame relay switch 31 are varied, with reference to FIG. 22.

The command receiving part 63 in the frame relay switch 31 is in a state waiting for a command from the system console 38, and performs the command receiving process when a command is inputted from the system console 38 <step S601>.

Then, the command receiving part 63 determines whether the command received in the step S601 is a change command for the first and second connection thresholds and/or the first and second disconnection thresholds (connection/disconnection threshold change command) or not <step S602>. When the command is the connection/disconnection threshold change command, the command receiving part 63 waits that the changed first and second connection thresholds and the changed first and second disconnection thresholds (changed connection/disconnection threshold) are inputted from the system console 38, and inputs the connection/disconnection threshold change command and the changed connection/disconnection threshold to the quality information management processing part 62. Thereafter, the operation of the command receiving part 63 is finished.

On the contrary, when the command received in the step S601 is not the connection/disconnection threshold change command, the command receiving part 63 determines whether the received command is the change command for the discard frequent occurrence threshold and/or the reception frequent occurrence threshold (frequent occurrence threshold change command) or not <step S603>. Then, when the command is not the frequent occurrence threshold change command, the operation is finished. When the command is the frequent occurrence threshold change command, the command receiving part 63 waits that the change frequent occurrence threshold is inputted from the system console 38. Then, the command receiving part 63 inputs the frequent occurrence threshold change command and the changed frequent occurrence threshold to the quality information management processing part 62, and stops the operation.

In the step S604, the quality information management processing part 62 starts. The quality information management processing part 62 determines whether the command inputted from the command receiving part 63 thereto is the connection/disconnection threshold change command or not <step S605>. At that time, when the quality information management processing part 62 determines that the command is the connection/disconnection threshold change command, it retrieves the threshold management table 48 and changes the threshold in the corresponding storage area to the changed connection/disconnection threshold inputted thereto <step S606>. With this arrangement, the values of the first and second connection thresholds and the first and second disconnection thresholds are changed.

When the operation is advanced to the step S607, the quality information management processing part 62 determines whether the command inputted thereto is the frequent occurrence threshold change command or not. At that time, when the quality information management processing part 62 determines that the command is not the frequent occurrence change command, the operation thereof is finished. When the quality information management processing part 62 determines that the command is the frequent occurrence change command, it retrieves the threshold storage table 51 and changes the discard frequent occurrence threshold and/or the reception frequent occurrence threshold stored in the corresponding storage area to the change frequent occurrence threshold <step S608>. When the operation in the step S608 is finished, the operation of the quality information management processing part 62 is finished. With this arrangement, the fourth operation in the frame relay switch 31 is finished.

According to the network system of this embodiment, the frame reception part 55 in the frame relay network FR1, FR2 (frame relay switch 31) calculates a difference between the transmission number of the frame header and the receiving status variable stored in the continuous number management table 52, namely, a number of frames F discarded in the ATM network 20, and stores it in the quality information collection table 49.

The IWF 21 stores a congestion notification stored in the cell header 75 of the ATM cell S in the congestion information storage area 26b of the frame header in the frame F, and the frame reception processing part 55 in the frame relay switch 31 stores the congestion notification. Therefore, it becomes possible for administrators of the frame relay networks FR1, FR2 to recognize the number of discarded frames F and the frequency of congestion notification reception in the ATM network 20.

Further, since the number of discarded frames and the frequency of congestion notification reception are recognized every frame relay network and every DLCI corresponding to that network, it becomes possible for the administrators of the frame relay networks FR1, FR2 to deal each network suitably.

In the frame relay networks FR1, FR2, the quality condition analyzing part 58 starts periodically, compares the number of discarded frames with the discard frequent occurrence threshold, and then outputs the caution message when the number of discarded frames is over the discard frequent occurrence threshold. The caution message is also outputted when the frequency of congestion notification reception exceeds the reception frequent occurrence threshold. Therefore, it becomes possible for the administrators of the frame relay networks FR1, FR2 to recognize the frequent occurrence of discarded frames F or congestion notification reception in the ATM network 20.

The discard frequent occurrence threshold and the reception frequent occurrence threshold are set every frame relay network FR1, FR2 and every DLCI number corresponding to that network. Therefore, a discrimination can be achieved in accordance with the importance of the transmission path (PVC) for a frame F.

In the frame relay networks FR1, FR2, the quality condition analyzing part 58 starts periodically, and automatically connects/disconnects the frame relay networks FR1, FR2 with the ISDN circuit 23. Therefore, though a congestion occurs in the ATM network 20, a band can be kept for frame relay communication. The frame relay switch 31 can also avoid to perform unnecessary process when no backup is needed. Additionally, since this network system is structured in a manner that a frame F is transmitted to the ATM network 20 in spite of the state that a backup is used, the number of discarded frames and the frequency of congestion notification reception in the ATM network 20 can be recognized in the transmitted frame relay network.

Moreover, each threshold set in this embodiment can be changed by the command receiving part 63 and the quality information management processing part 62, therefore, it becomes possible for the administrators of the frame relay networks FR1, FR2 to deal with this network system in accordance with the condition thereof. Thus, it becomes possible to respond requests from users of the terminals 22a, 22b suitably.

In this embodiment, the network system is structured in a manner that the number of discarded frames and the frequency of congestion notification reception are recognized in the frame relay networks FR1, FR2, however, a structure for recognizing them may be provided in the IWF 21, and then they are recognized in the IWF 21.

In this embodiment, the backup circuit is connected/disconnected every frame relay network, however, the backup circuit may be connected/disconnected every DLCI. Moreover, in this embodiment, two frame relay networks are provided, however, more than two frame relay networks may be connected with the ATM network through IWFs.

According to the network system and the frame relay switch of the present invention, though an ATM switch is used as a relay for plural frame relay networks, administrators of frame relay networks can obtain proper quality information of the ATM network. Further, it is possible to manage the frame relay networks in accordance with the quality information in the ATM network, particularly, since the frame relay networks are connected each other through the backup circuit in accordance with the backup circuit, a band for frame relay communication can be kept.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. A network system comprising an ATM (Asynchronous Transfer Mode) network, plural IWFs (Inter Work Function) respectively connected to the ATM network, plural frame relay networks respectively connected to the plural IWFs, and plural terminals respectively connected to the plural frame relay networks; wherein, each of said plural frame relay networks including:
addition means, when a frame is transmitted to one of the plural IWFs, for adding a quality information header in which quality information of the ATM network is stored to the frame;
reading means, when a frame is received from one of the plural IWFs, for reading the quality information from the quality information header of the frame; and,
memory means for memorizing the quality information read by the reading means, wherein each of the plural frame relay networks further including:
reception frequency storage means for memorizing a reception frequency of frames received from one of the plural IWFs;
transmission number storage means, when the frame is transmitted to one of the plural IWFs, for storing a transmission number in the quality information header of the frame; and,
obtainment means, when the frame is received from one of the plural IWFs, for reading the transmisison number from the quality information header and reading the reception frequency of the frame from the reception frequency storage means, and for obtaining a difference between the transmission number and the reception frequency of the frame as a number of discarded frames in the ATM network.

2. A network system according to the claim 1, wherein each of the plural frame relay networks is connected to one of the plural IWFs through a channel which plural data links are set, and the quality information of the ATM network is memorized correspondingly to the plural data links.

3. A network system comprising an ATM (Asynchronous Transfer Mode) network, plural IWFs (Inter Work Function) respectively connected to the ATM network, plural frame relay networks respectively connected to the plural IWFs, and plural terminals respectively connected to the plural frame relay networks; wherein, each of said plural frame relay networks including:
addition means, when a frame is transmitted to one of the plural IWFs, for adding a quality information header in which quality information of the ATM network is stored to the frame;
reading means, when a frame is received from one of the plural IWFs, for reading the quality information from the quality information header of the frame; and,
memory means for memorizing the quality information read by the reading means,
wherein each of the plural frame relay networks further includes caution means for outputting a caution message outward based on the quality information memorized in said memory means, and
the quality information memorized in said memory means is a number of discarded frames in the ATM network for a predetermined period, and said caution means starts when the number memorized in said memory means of the discarded frames becomes not less than a predetermined threshold.

4. A network system according to the claims 3, wherein each of the plural IWFs including;
restoration means for restoring plural cells received from the ATM network to one frame; and,
edition means, when a congestion notification is stored in a cell header of one of the plural cells, for storing the congestion notification in the quality information header of the frame restored by the restoration means.

5. A network system according to claim 3, wherein each of the plural frame relay networks further includes change means for changing the predetermined threshold for a new threshold which is inputted.

6. A network system comprising an ATM (Asynchronous Transfer Mode) network, plural IWFs (Inter Work Function) respectively connected to the ATM network, plural frame relay networks respectively connected to the plural IWFs, and plural terminals respectively connected to the plural frame relay networks; wherein, each of said plural frame relay networks including:
addition means, when a frame is transmitted to one of the plural IWFs, for adding a quality information header in which quality information of the ATM network is stored to the frame;
reading means, when a frame is received from one of the plural IWFs, for reading the quality information from the quality information header of the frame; and,
memory means for memorizing the quality information read by the reading means, wherein each of the plural frame relay networks further includes caution means for outputting a caution message outward based on the quality information memorized in said memory means, and
the quality information memorized in said memory means is a number of congestion notifications from the ATM network for a predetermined period, and said caution means starts when the number memorized in said memory means of the congestion notifications becomes not less than a predetermined threshold.

7. A network system comprising an ATM (Asynchronous Transfer Mode) network, plural IWFs (Inter Work Function) respectively connected to the ATM network, plural frame relay networks respectively connected to the plural IWFs, and plural terminals respectively connected to the plural frame relay networks; wherein, each of said plural frame relay networks including:
addition means, when a frame is transmitted to one of the plural IWFs, for adding a quality information header in which quality information of the ATM network is stored to the frame;
reading means, when a frame is received from one of the plural IWFs, for reading the quality information from the quality information header of the frame;
memory means for memorizing the quality information read by the reading means; and,
a backup circuit connected to each of the plural frame relay networks;
wherein each of the plural frame relay networks further comprises backup means for connecting one of the plural frame relay networks and the backup circuit based on the quality information memorized in said memory means, and
the quality information memorized in said memory means is a number of discarded frames in the ATM network for a predetermined period, and said backup means, when the number memorized in said memory means of the discarded frames becomes not less than a predetermined threshold, connects one of the plural frame relay networks and said backup circuit.

8. A network system according to the claim 7, wherein each of said backup means disconnects one of the plural frame relay networks and the backup circuit based on the quality information memorized in said memory means.

9. A network system according to the claim 7, wherein each of the plural frame networks, when the each of the plural frame networks and the backup circuit are connected, transmits the frame to the backup circuit and an IWF connected to the each of the plural frame networks.

10. A network system according to the claim 9, wherein each of the plural frame networks, when the each of the plural frame networks and the backup circuit are connected, stores a discard eligibility indicator indicating that the frame is enable to be discarded in taking priority in the quality information header.

11. A network system comprising an ATM (Asynchronous Transfer Mode) network, plural IWFs (Inter Work Function) respectively connected to the ATM network, plural frame relay networks respectively connected to the plural IWFs, and plural terminals respectively connected to the plural frame relay networks; wherein, each of said plural frame relay networks including:
addition means, when a frame is transmitted to one of the plural IWFs, for adding a quality information header in which quality information of the ATM network is stored to the frame;

reading means, when a frame is received from one of the plural IWFs, for reading the quality information from the quality information header of the frame;

memory means for memorizing the quality information read by the reading means; and, a backup circuit connected to each of the plural frame relay networks;

wherein each of the plural frame relay networks further comprises backup means for connecting one of the plural frame relay networks and the backup circuit based on the quality information memorized in said memory means, and the quality information memorized in said memory means is a number of congestion notifications in the ATM network for a predetermined period, and said backup means, when the number memorized in said memory means of the congestion notifications becomes not less than a predetermined threshold, connects one of the plural frame relay networks and said backup circuit.

12. A network system comprising an ATM (Asynchronous Transfer Mode) network, plural IWFs (Inter Work Function) respectively connected to the ATM network, plural frame relay networks respectively connected to the plural IWFs, and plural terminals respectively connected to the plural frame relay networks; wherein, each of said plural frame relay networks including:

addition means, when a frame is transmitted to one of the plural IWFs, for adding a quality information header in which quality information of the ATM network is stored to the frame;

reading means, when a frame is received from one of the plural IWFs, for reading the quality information from the quality information header of the frame;

memory means for memorizing the quality information read by the reading means; and, a backup circuit connected to each of the plural frame relay networks;

wherein each of the plural frame relay networks further comprises backup means for connecting one of the plural frame relay networks and the backup circuit based on the quality information memorized in said memory means, and the quality information memorized in said memory means is a number of discarded frames in the ATM network for a predetermined period, and said backup means, when the number memorized in said memory means of the discarded frames becomes less than a predetermined threshold, disconnects one of the plural frame relay networks and said backup circuit.

13. A network system comprising an ATM (Asynchronous Transfer Mode) network, plural IWFs (Inter Work Function) respectively connected to the ATM network, plural frame relay networks respectively connected to the plural IWFs, and plural terminals respectively connected to the plural frame relay networks; wherein, each of said plural frame relay networks including:

addition means, when a frame is transmitted to one of the plural IWFs, for adding a quality information header in which quality information of the ATM network is stored to the frame;

reading means, when a frame is received from one of the plural IWFs, for reading the quality information from the quality information header of the frame;

memory means for memorizing the quality information read by the reading means; and, a backup circuit connected to each of the plural frame relay networks;

wherein each of the plural frame relay networks further comprises backup means for connecting one of the plural frame relay networks and the backup circuit based on the quality information memorized in said memory means, and the quality information memorized in said memory means is a number of congestion notifications in the ATM network for a predetermined period, and said backup means, when the number memorized in said memory means of the congestion notifications becomes less than a predetermined threshold, disconnects one of the plural frame relay networks and said backup circuit.

14. A frame relay switch connected with an ATM (Asynchronous Transfer Mode) network through an IWF (Inter Work Function) and comprised in a frame relay network connected with plural terminals comprising:

addition means, when a frame is transmitted to the IWF, for adding a quality information header in which quality information of the ATM network is added to the frame;

reading means, when a frame is received from the IWF, for reading the quality information from the quality information header;

memory means for memorizing the quality information read by the reading means;

reception frequency storage means for memorizing a reception frequency of frames received from the IWF;

transmission number storage means, when the frame is transmitted to the IWF, for storing a transmission number in the quality information header of the frame; and, obtainment means, when the frame is received from one of the plural IWFs, for reading the transmission number from the quality information header and reading the reception frequency of the frame from the reception frequency storage means, and for obtaining a difference between the transmission number and the reception frequency of the frame as a number of discarded frames in the ATM network.

15. A frame relay switch connected with an ATM (Asynchronous Transfer Mode) network through an IWF (Inter Work Function) and comprised in a frame relay network connected with plural terminals comprising:

addition means, when a frame is transmitted to the IWF, for adding a quality information header in which quality information of the ATM network is added to the frame;

reading means, when a frame is received from the IWF, for reading the quality information from the quality information header;

memory means for memorizing the quality information read by the reading means; and, caution means for outputting a caution message outward based on the quality information memorized in the memory means, wherein the quality information memorized in said memory means is a number of discarded frames in the ATM network for a predetermined period, and said caution means starts when the number memorized in said memory means of the discarded frames becomes not less than a predetermined threshold.

16. A frame relay switch according to claim 15, further comprising:

change means for changing the predetermined threshold for a new threshold which is inputted.

17. A frame relay switch according to the claim 15, wherein the frame relay switch is connected to the IWF through a channel which plural data links are set, and the quality information of the ATM network is memorized correspondingly to the plural data links in said memory means.

18. A frame relay switch connected with an ATM (Asynchronous Transfer Mode) network through an IWF (Inter Work Function) and comprised in a frame relay network connected with plural terminals comprising:

addition means, when a frame is transmitted to the IWF, for adding a quality information header in which quality information of the ATM network is added to the frame;

reading means, when a frame is received from the IWF, for reading the quality information from the quality information header;

memory means for memorizing the quality information read by the reading means; and, caution means for outputting a caution message outward based on the quality information memorized in the memory means, wherein the quality information memorized in said memory means is a number of congestion notifications from the ATM network for a predetermined period, and said caution means starts when the number memorized in said memory means of the congestion notifications becomes not less than a predetermined threshold.

19. A frame relay switch according to the claim 18, wherein the frame is transmitted to the backup circuit and the IWF when the data communication is performed by using the backup circuit.

20. A frame relay switch according to the claim 19, wherein a discard eligibility indicator indicating that the frame is enable to be discarded in taking priority is stored in the quality information header when the data communication is performed by using the backup circuit.

21. A frame relay switch connected with an ATM (Asynchronous Transfer Mode) network through an IWF (Inter Work Function) and comprised in a frame relay network connected with plural terminals comprising:

addition means, when a frame is transmitted to the IWF, for adding a quality information header in which quality information of the ATM network is added to the frame;

reading means, when a frame is received from the IWF, for reading the quality information from the quality information header;

memory means for memorizing the quality information read by the eading means; and, caution means for outputting a caution message outward based on the quality information memorized in the memory means, wherein the quality information memorized in said memory means is a number of discarded frames in the ATM network for a predetermined period, and said backup means, when the number memorized in said memory means of the discarded frames becomes not less than a predetermined threshold, performs the data communication with the another frame relay network by the backup circuit.

22. A frame relay switch connected with an ATM (Asynchronous Transfer Mode) network through an IWF (Inter Work Function) and comprised in a frame relay network connected with plural terminals comprising:

addition means, when a frame is transmitted to the IWF, for adding a quality information header in which quality information of the ATM network is added to the frame;

reading means, when a frame is received from the IWF, for reading the quality information from the quality information header; and, memory means for memorizing the quality information read by the reading means, wherein a backup circuit connected to another frame relay network is connected with the frame relay switch, and data communication is performed between the frame relay switch and the another frame relay switch by the backup circuit based on the quality information memorized in the memory means, and the quality information memorized in said memory means is a number of congestion notifications in the ATM network for a predetermined period, and said backup means, when the number memorized in said memory means of the congestion notifications becomes not less than a predetermined threshold, performs the data communication with the another frame network by the backup circuit.

* * * * *